(12) United States Patent
Ishida et al.

(10) Patent No.: US 6,411,898 B2
(45) Date of Patent: Jun. 25, 2002

(54) NAVIGATION DEVICE

(75) Inventors: Akira Ishida; Yoshiki Ueyama, both of Sakai; Kiyomi Sakamoto, Ikoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/839,363

(22) Filed: Apr. 23, 2001

(30) Foreign Application Priority Data

Apr. 24, 2000 (JP) ........................................ 2000-122685

(51) Int. Cl.$^7$ ................................................. G01C 3/06
(52) U.S. Cl. ........................ 701/211; 701/300; 701/301; 340/436; 348/118
(58) Field of Search ................................ 701/211, 200, 701/213, 301, 300; 340/436; 348/118

(56) References Cited

U.S. PATENT DOCUMENTS

| | | | | |
|---|---|---|---|---|
| 5,128,874 A | * | 7/1992 | Bhanu et al. | 701/301 |
| 5,612,883 A | * | 3/1997 | Shaffer et al. | 701/300 |

FOREIGN PATENT DOCUMENTS

| | | |
|---|---|---|
| JP | 8-241419 | 9/1996 |
| JP | 8-293098 | 11/1996 |
| JP | 9-58343 | 3/1997 |
| JP | 9-178505 | 7/1997 |
| JP | 11-3499 | 1/1999 |
| JP | 11-250395 | 9/1999 |
| JP | 11-272639 | 10/1999 |
| JP | 11-272640 | 10/1999 |
| JP | 11-311515 | 11/1999 |
| JP | 11-321494 | 11/1999 |
| JP | 2000-20884 | 1/2000 |
| JP | 2000-20898 | 1/2000 |
| JP | 2000-99864 | 4/2000 |
| JP | 2000-203465 | 7/2000 |
| JP | 2000-222698 | 8/2000 |
| JP | 2000-238594 | 9/2000 |

OTHER PUBLICATIONS

"Development of a Car Navigation System with a Bird's–Eye View Map Display", Society of Automotive Engineers of Japan Inc., Papers, 962, 1996–5.

* cited by examiner

Primary Examiner—William A. Cuchlinski, Jr.
Assistant Examiner—Marthe Y. Marc-Coleman
(74) Attorney, Agent, or Firm—Wenderoth, Lind & Ponack, L.L.P.

(57) ABSTRACT

In a navigation device assisting a driver of a vehicle to drive safely by presenting accurate information at the right time what is going on around his/her vehicle, an obstacle detection part detects any obstacle with the help of external information monitored by an external monitor part. By utilizing the vehicle's current position detected by an input part and a position detection part, and map data stored in a map data storage part, a route selection part searches for a route to a destination. Based on thus found route, current position, map data, and the external information from the obstacle detection part, a guiding part performs route guidance to the destination. A map data arranging part refers to the map data, information from the obstacle detection part and the input part, and object model display information from the object model display information storage part, and arranges any applicable object model onto a map data space. A display accordingly displays guidance information together with the resulting map image.

23 Claims, 22 Drawing Sheets

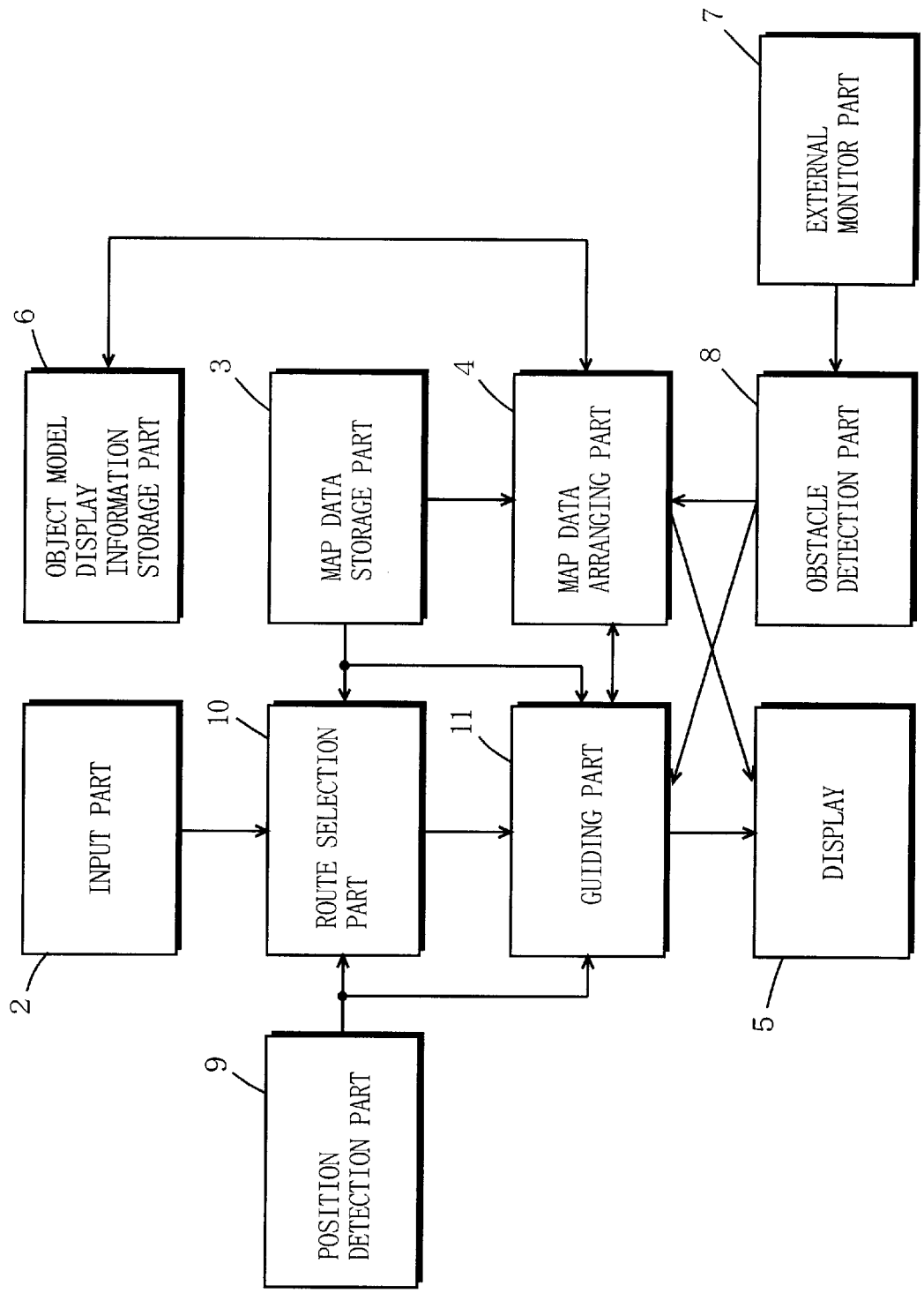

FIG. 9

| WITH-CARE VEHICLE ATTRIBUTE \ WITH-CARE STATE | LANE CHANGE | | MAKE TURN | | BRAKE | | NARROWED | | CURVED | |
|---|---|---|---|---|---|---|---|---|---|---|
| | TO RIGHT | TO LEFT | TO RIGHT | TO LEFT | DECELERATION | FULL STOP | RIGHT LANE | LEFT LANE | TO RIGHT | TO LEFT |
| APPROACHING — RIGHT LANE | 1 | 0 | 1 | 0 | 0 | 0 | 1 | 0 | 1 | 0 |
| APPROACHING — THE SAME LANE | 0 | 0 | 1 | 1 | 1 | 0 | 0 | 0 | 0 | 0 |
| APPROACHING — LEFT LANE | 0 | 1 | 0 | 1 | 0 | 0 | 0 | 1 | 0 | 1 |
| BLINKER — RIGHT SIDE | 1 | 0 | 0 | 0 | 0 | 0 | 1 | 0 | 0 | 0 |
| BLINKER — LEFT SIDE | 0 | 1 | 0 | 0 | 0 | 0 | 0 | 1 | 0 | 0 |
| MOTORCYCLE | 0 | 0 | 0 | 1 | 0 | 1 | 0 | 0 | 0 | 0 |
| WITH-CARE SIGN | 0 | 0 | 1 | 1 | 1 | 0 | 0 | 0 | 0 | 0 |
| MEANDERING | 1 | 1 | 1 | 1 | 1 | 1 | 0 | 0 | 0 | 0 |
| EMERGENCY VEHICLE | 1 | 1 | 1 | 1 | 1 | 1 | 1 | 1 | 1 | 1 |

F I G. 1 7
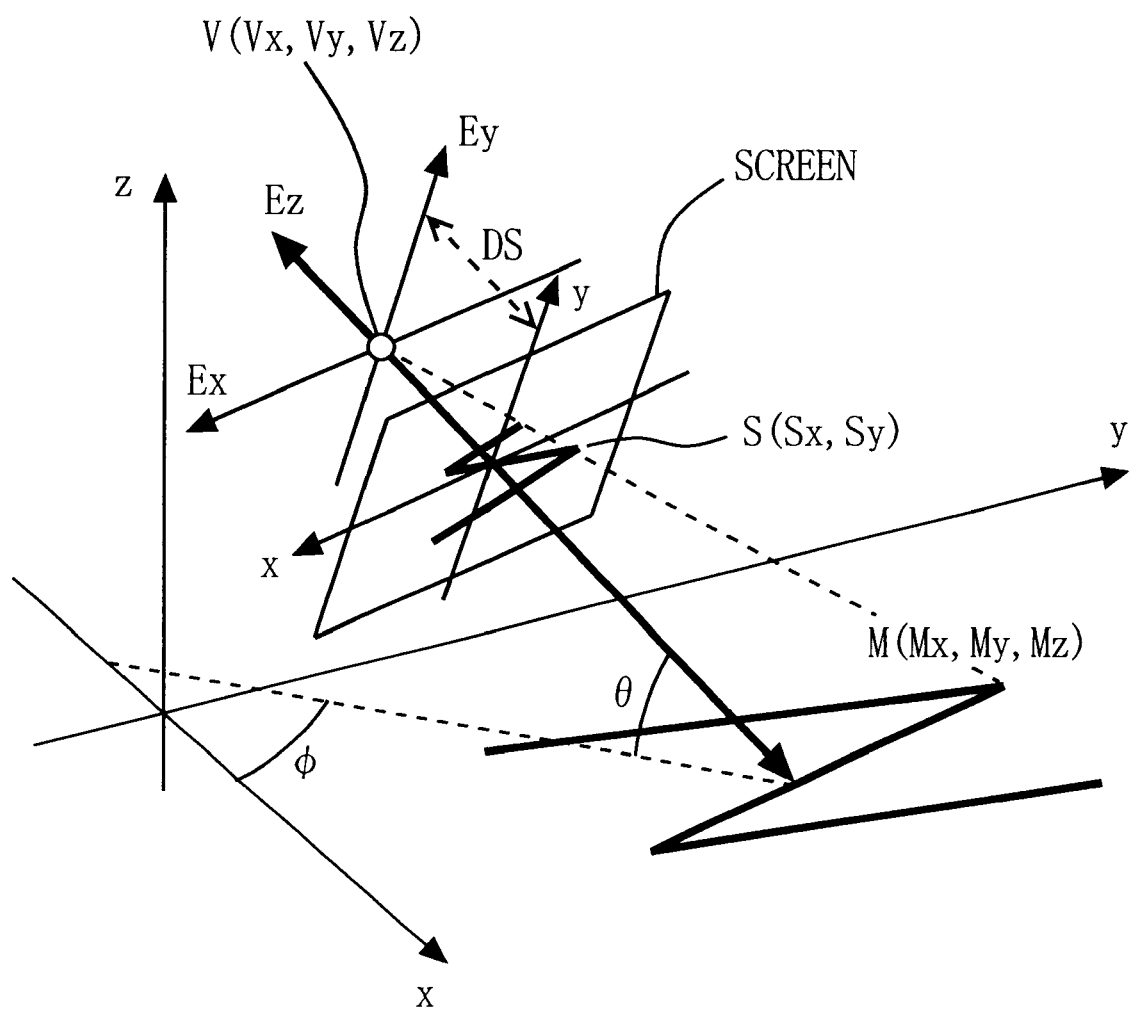

FIG. 23
| | IMAGE FOR CORRESPONDING INFORMATION (DISPLAYED PLURALLY IN 2D) | | |
| --- | --- | --- | --- |
| | MEANDERING VEHICLE IMAGE | MOTORCYCLE IMAGE | WITH-CARE SIGN IMAGE |
| LONG-RANGE |  "SMark1.bmp" | 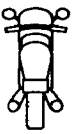 "SMark2.bmp" | 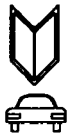 "SMark3.bmp" |
| MEDIUM-RANGE |  "MMark1.bmp" | 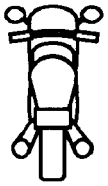 "MMark2.bmp" | 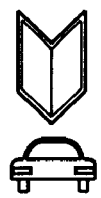 "MMark3.bmp" |
| CLOSE-RANGE | 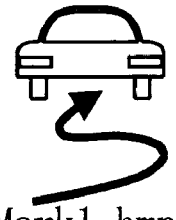 "LMark1.bmp" | 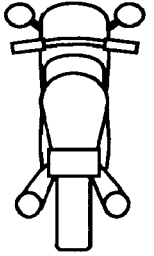 "LMark2.bmp" | 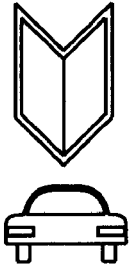 "LMark3.bmp" |

NAVIGATION DEVICE

BACKGROUND OF THE INVENTION

1. Field of the Invention

The present invention relates to navigation devices and, more specifically, to a navigation device for assisting the driver of a vehicle, in driving, by detecting and displaying him/her information about what is going on around the vehicle.

2. Description of the Background Art

There has been developed such system as monitoring around a vehicle on the road, with a sensor, to see what is going o[008e] therearound, and if collision with other vehicles is considered highly possible, warning the driver. For example, disclosed in Japanese Patent Laid-Open Publication No. 11-321494 (99-321494) is such conventional technique as follows.

First of all, a video signal outputted from a camera is subjected to image processing so as to detect if any vehicle is approaching. If detected any, the driver of a vehicle is warned by a beep. Also, as for the approaching vehicle, an image thereof is square-marked and displayed on a display device. Accordingly, the driver can spot on the display which vehicle is the one warned of collision.

In the above conventional technique, however, the driver is not provided much information when he/she is in danger, but offered adequate information when no danger awaits him/her. Therefore, even when the driver hears a warning beep, he/she may be annoyed as is hardly knowing if any danger awaits him/her, and how dangerous it actually is. Further, if the driver hears any route guidance while driving, he/she may be distracted thereby and pay close attention only to ahead but not to behind. In the conventional technique, no consideration is given to such possibility.

SUMMARY OF THE INVENTION

Therefore, an object of the present invention is to provide a navigation device for helping the driver of a vehicle drive safely, without annoying the driver, by presenting him/her accurate information at the right time what is going on around his/her vehicle.

The present invention has the following features to attain the object above.

An aspect of the present invention is directed to a navigation device of a vehicle-mounted type for detecting the circumstances around a vehicle, and if considers warning a user is appropriate, arranging an applicable object model for display on a map image, and making a guidance to a destination. In the present navigation device, an external monitor part monitors the circumstances around the vehicle, and outputs resulting monitor information. Based on the monitor information, an obstacle detection part detects any obstacle observed outside of the vehicle, and outputs external information including position information of the obstacle. Based on the external information, a guiding part determines if the obstacle requires the user's attention, and if requires, generates drive assistant information including the position information of the obstacle as in the external information. Based on thus generated drive assistant informatio[008e] an[0084] objec[009f] model display information fo[00f8] th[0085] obstacle, a map data arranging part creates an object model for arrangement on a map image. Further, the guiding part generates guidance information including the resulting map image outputted from a map data arranging part in response to the route selected by a route selection part, the current position detected by a position detection part, and map data from a map data storage part. Thus generated guidance information is displayed on a display part for the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a navigation device according to an embodiment of the present invention;

FIG. 9 is a table schematically showing the interrelation between a with-care state and a with-care vehicle;

FIG. 17 is a diagram demonstrating a technique for creating a bird's eye view by subjecting 2D map data to perspective transformation;

FIG. 23 is a diagram exemplarily showing several image files prepared as 2D shape information in object model display information.

DESCRIPTION OF THE PREFERRED EMBODIMENT

Figure 2:
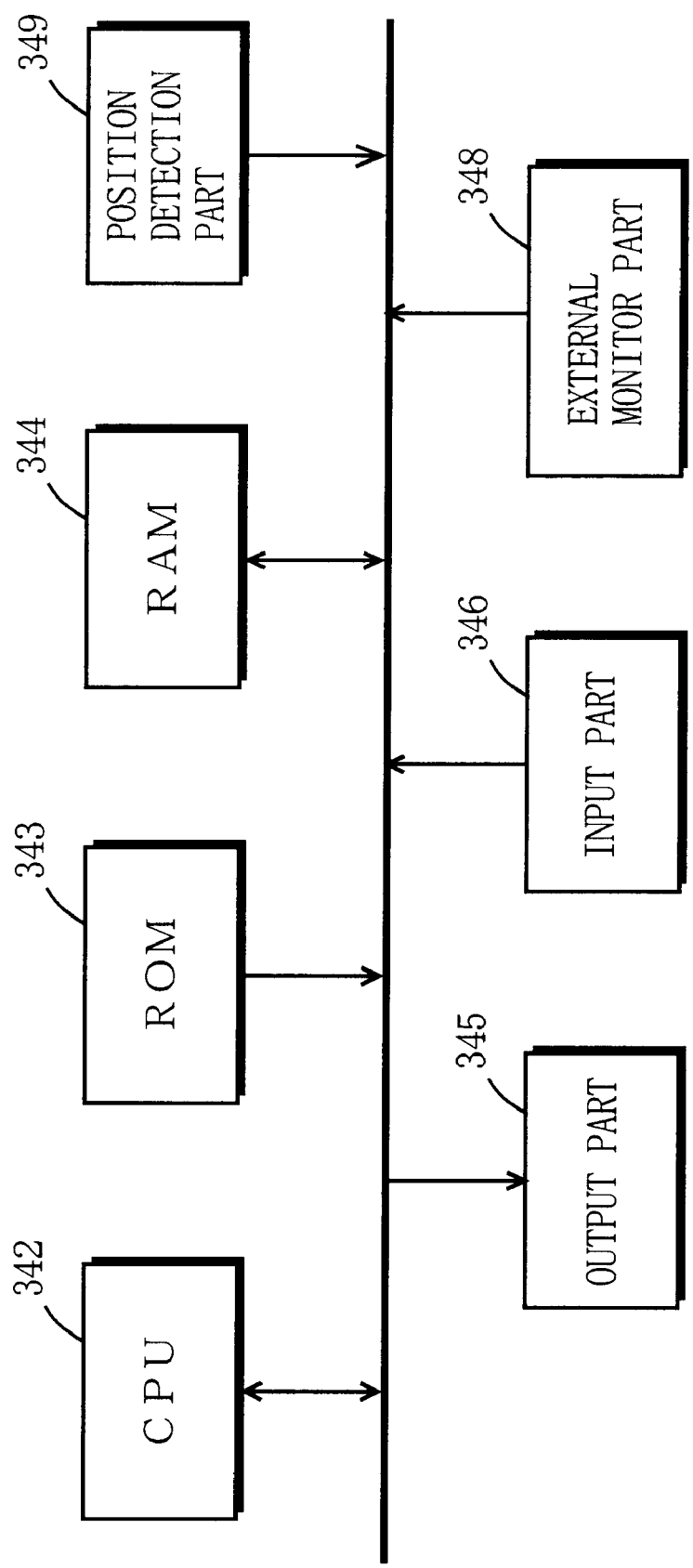
FIG. 2 is a diagram showing the structure of the navigation device of FIG. 1, which is realized in a general computer system.

FIG. 1 is a block diagram showing the structure of a navigation device according to an embodiment of the present invention. In FIG. 1, the navigation device includes an input device 2, a map data storage part 3, a map data arranging part 4, a display 5, an object model display information storage part 6, an external monitor part 7, an obstacle detection part 8, a position detection part 9, a route selection part 10, and a guiding part 11.

The input part 2 is driver-operable, and used for functional selection (e.g., processing item change, map switching, hierarchical level change), point settings, and the like. Outputted from the input part 2 is instruction information, which is forwarded to the route selection part 10.

The position detection part 9 is composed of a GPS, radio beacon receiver, vehicle-speed sensor, angular velocity sensor, absolute azimuth sensor, or the like, and detects the vehicle's current position. Outputted from the position detection part 9 is information about the vehicle's current position, which is forwarded to both the route selection part 10 and the guiding part 11.

The external monitor part 7 may be a CCD camera, laser radar, ultrasound sensor, or the like, and monitors around the vehicle to know, typically, whether any obstacle is observed or how vehicles behind are behaving. The external monitor part 7 then outputs resulting monitor information to the obstacle detection part 8. Here, the external monitor part 7 may communicate with other vehicles, a traffic control center, and the like, to monitor around its own vehicle. To realize such monitoring, however, system establishment is required and thus the cost is increased. Accordingly, the external monitor part 7 is preferably structured by a sensor, for example. An image capture device such as camera is also a preferable possibility for the external monitor part 7 as is competent to human eyes at perceiving things.

Based on the monitor information provided by the external monitor part 7, the obstacle detection part 8 analyzes an obstacle, and what type, position, speed, and the like, and outputs external information, which will be described later. Here, such obstacle includes anything requiring the driver's close attention or disturbing him/her to drive. As examples, anything lying ahead on the road, any vehicle approaching from behind, and any vehicle recklessly behaving are all regarded as an obstacle.

The map data storage part 3 is composed of an optical disk (e.g., CD, DVD), hard disk, semiconductor memory card (e.g., SD card), or the like. The map data storage part 3 in advance stores 2D or 3D map data indicating a specific area by geographical features, and in the area, intersections and road connections are defined by coordinates, shape, attribute, regulation information, and the like. The map data stored in the map data storage 3 is read as appropriate, for usage, by the map data arranging part 4, the route selection part 10, and the guiding part 11.

The route selection part 10 reads the map data from the map data storage part 3 only for a required area according to the instruction information provided by the input part 2. The route selection part 10 then determines a starting point and a destination based on point information included in the instruction information, and the information about the vehicle's current position provided by the position detection part 9. Thereafter, the route selection part 10 searches for a route minimum in cost between the starting point and the destination. A result obtained thereby is outputted to the guiding part 11 as route information.

Based on all of the route information from the route selection part 10, the information about the vehicle's current position from the position detection part 9, the map data from the map data storage part 3, and the external information from the obstacle detection part 8, the guiding part 11 generates guidance information for guiding the vehicle to the destination. This guidance information is provided to the display 5 for display thereon.

The map data arranging part 4 arranges object models in a map space. This arrangement is done based all on the map data stored in the map data storage part 3, the information provided by the obstacle detection part 8, and the information stored in the object model display information storage part 6.

The display 5 is composed of a display device (e.g., liquid crystal display, CRT display), speaker, and the like, and displays the guidance information together with a resulting map image provided by the map data arranging part 4. Alternatively, the display 5 may output sounds for guidance with or without performing display.

As is the map data storage part 3, the object model display information storage part 6 is also composed of an optical disk, hard disk, or the like. Stored therein is information about a technique for presenting 2D or 3D object models on a map image according to the information provided by the obstacle detection part 8 or the input part 2. About the technique and the details of the information are left for later description.

Such structured navigation device of FIG. 1 can be realized in a general computer system. The structure of a navigation device realized as such is shown in FIG. 2.

In FIG. 2, the navigation device includes a CPU 342, ROM 343, RAM 344, an output part 345, an input part 346, a position detection part 349, and an external monitor part 348, all of which are interconnected by a common bus or an external bus. Here, presumably, the ROM 343 and the RAM 344 both possibly include a storage device including an external storage medium.

In FIG. 2, the CPU 342 operates in accordance with programs stored in either or both of the ROM 343 and the RAM 344. All of the map data arranging part 4, the obstacle detection part 8, the route selection part 10, and the guiding part 11 are functionally realized by each corresponding program. In such case, a recording medium typically storing such programs is implemented in the navigation device. The program may be the one transmitted over a communications circuit.

The ROM 343 typically includes the map data storage part 3 of FIG. 1, or the RAM 344 may do so entirely or partially. Similarly, the RAM 344 typically includes the object model display information storage part 6, or the ROM 343 may do so.

Figure 3:
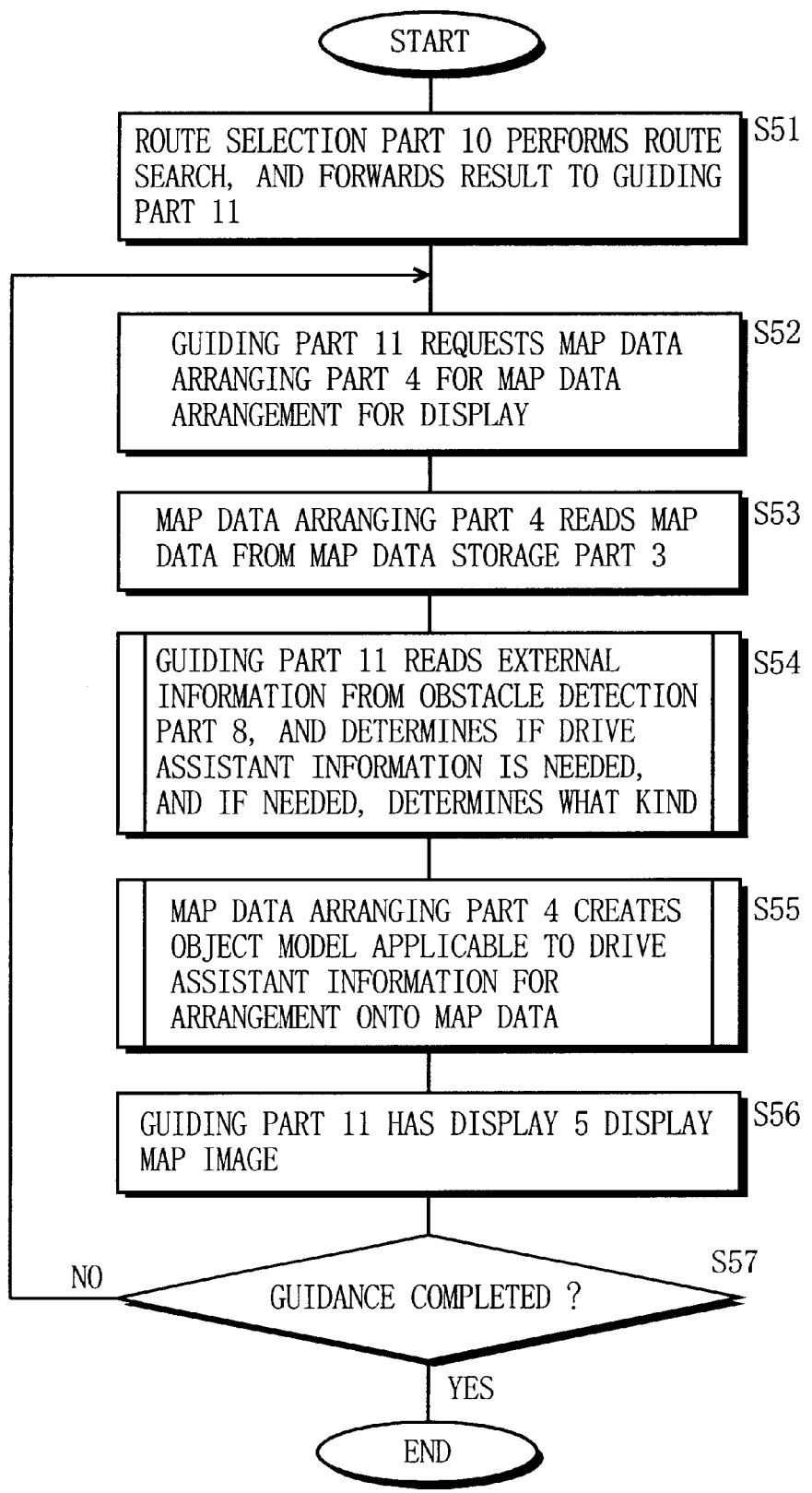
FIG. 3 is a flowchart showing a basic flow of processing in the present navigation device.

FIG. 3 is a flowchart showing a basic flow of processing in the present navigation device. In step S51 of FIG. 3, with driver-designated destination and map region provided by the input part 2, and with a vehicle position provided by the position detection part 9, the route selection part 10 accordingly performs route search. A result obtained thereby is outputted to the guiding part 11.

Next, in step S52, the guiding part 11 requests the map data arranging part 4 for map data arrangement to display a map which covers an area corresponding to the vehicle position detected by the position detection part 9. In step S53, the map data arranging part 4 reads map data from the map data storage part 3.

In subroutine step S54, the guiding part 11 reads external information from the obstacle detection part 8 to see the circumstances around the vehicle, for example, whether the vehicle is about to make a right/left turn. Based on the external information and the route search result, the guiding part 11 determines if the vehicle needs any drive assistant information, and if needed, what kind of information. The details for this subroutine step S54 are left for later description.

In subroutine step S55, according to the drive assistant information and the information stored in the object model display information storage part 6, the map data arranging part 4 creates a 2D or 3D object model for arrangement on the map data read from the map data storage part 3. The details for this subroutine step S55 are also left for later description.

In step S56, the guidance part 11 has the display 5 display the map image for guidance information or the map image wherein object models are arranged. Herein, the guidance information is not necessarily displayed on the map image, and the guiding part 11 may be functionally substituted by the map data arranging part 4 for this operation.

Lastly, instep S57, the guiding part 11 keeps providing guidance until the vehicle reaches its destination. Thus, the procedure returns to step S52 to repeat the processing until the guiding part 11 determines the vehicle having reached its destination.

Figure 4:
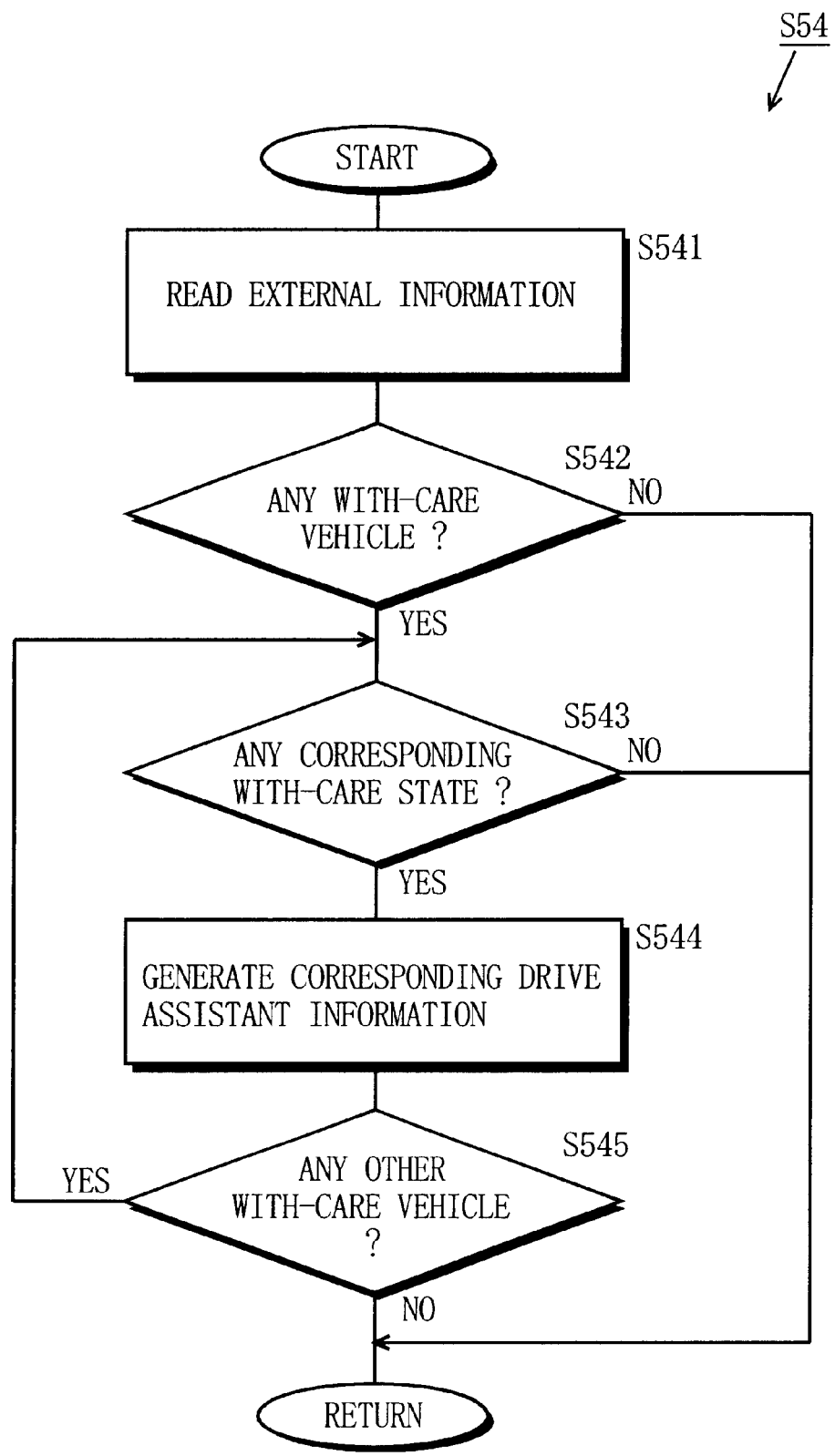
FIG. 4 is a flowchart showing the detailed process of subroutine step S54.

FIG. 4 is a flowchart showing the detailed process of subroutine step S54 of FIG. 3. In step S541 of FIG. 4, the guiding part 11 reads from the obstacle detection part 8 the external information, which is generated as appropriate by the obstacle detection part 8 based on the monitor information from the external monitor part 7.

Figure 5:
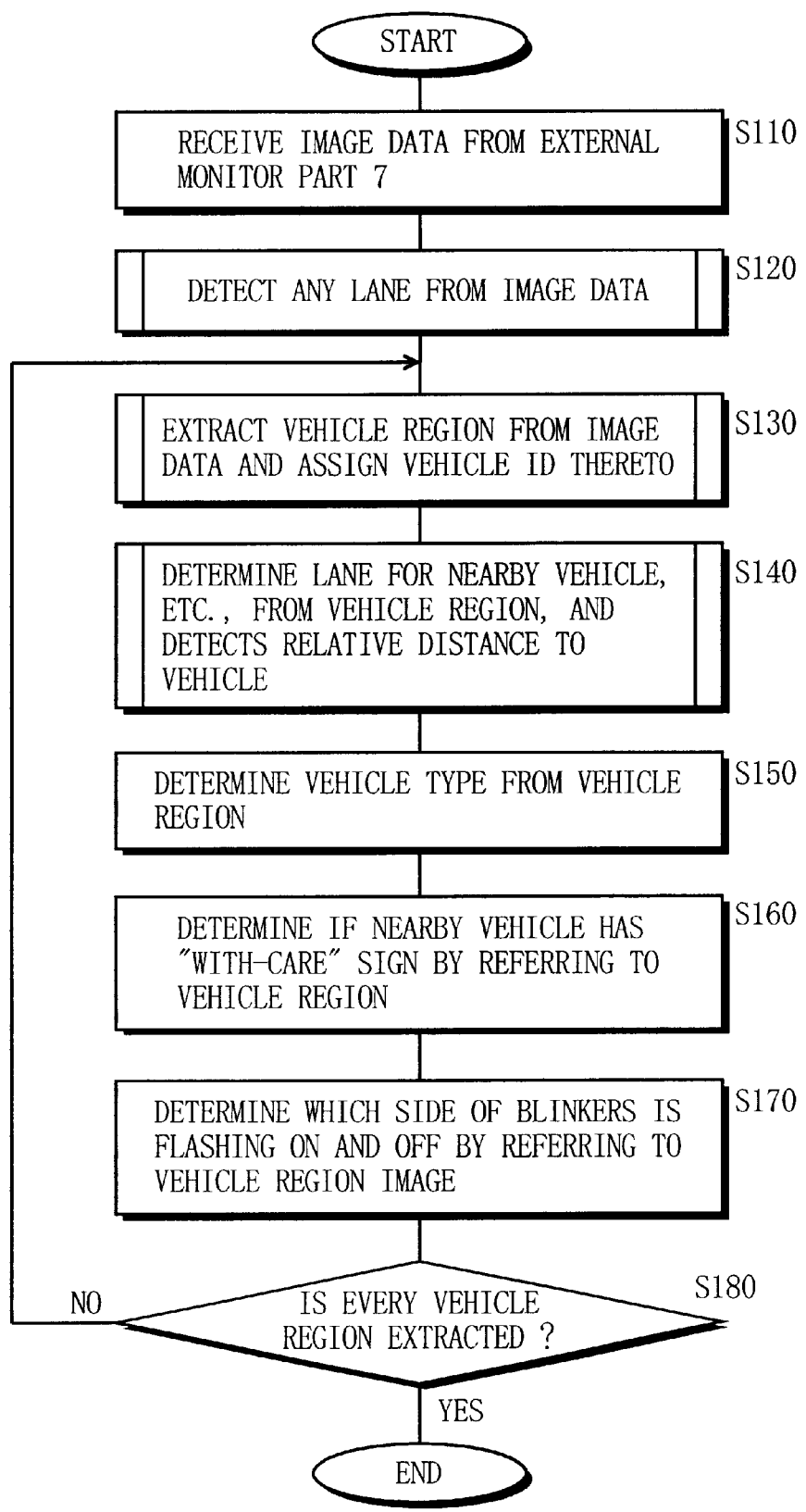
FIG. 5 is a flowchart showing a basic flow of processing for generating external information by an obstacle detection part 8.

Described in detail now is the operation of the obstacle detection part 8 for generating the external information. FIG. 5 is a flowchart showing a basic flow of processing in the obstacle detection part 8 for the purpose. Herein, presumably, the external monitor part 7 is structured by an image capture device such as CCD camera, for example, and captures image data.

In step S110 of FIG. 5, the obstacle detection part 8 receives image data from the external monitor part 7. Here, the image data is typically a still picture, but may be two still pictures captured by two cameras placed with a predetermined distance therebetween, or moving pictures for a predetermined time period.

In subroutine step S120, from the received image data, the obstacle detection part 8 detects any lane, which is presumably defined by a white line. By referring to FIG. 6, the detailed processing in this subroutine step S120 is now described.

Figure 6:
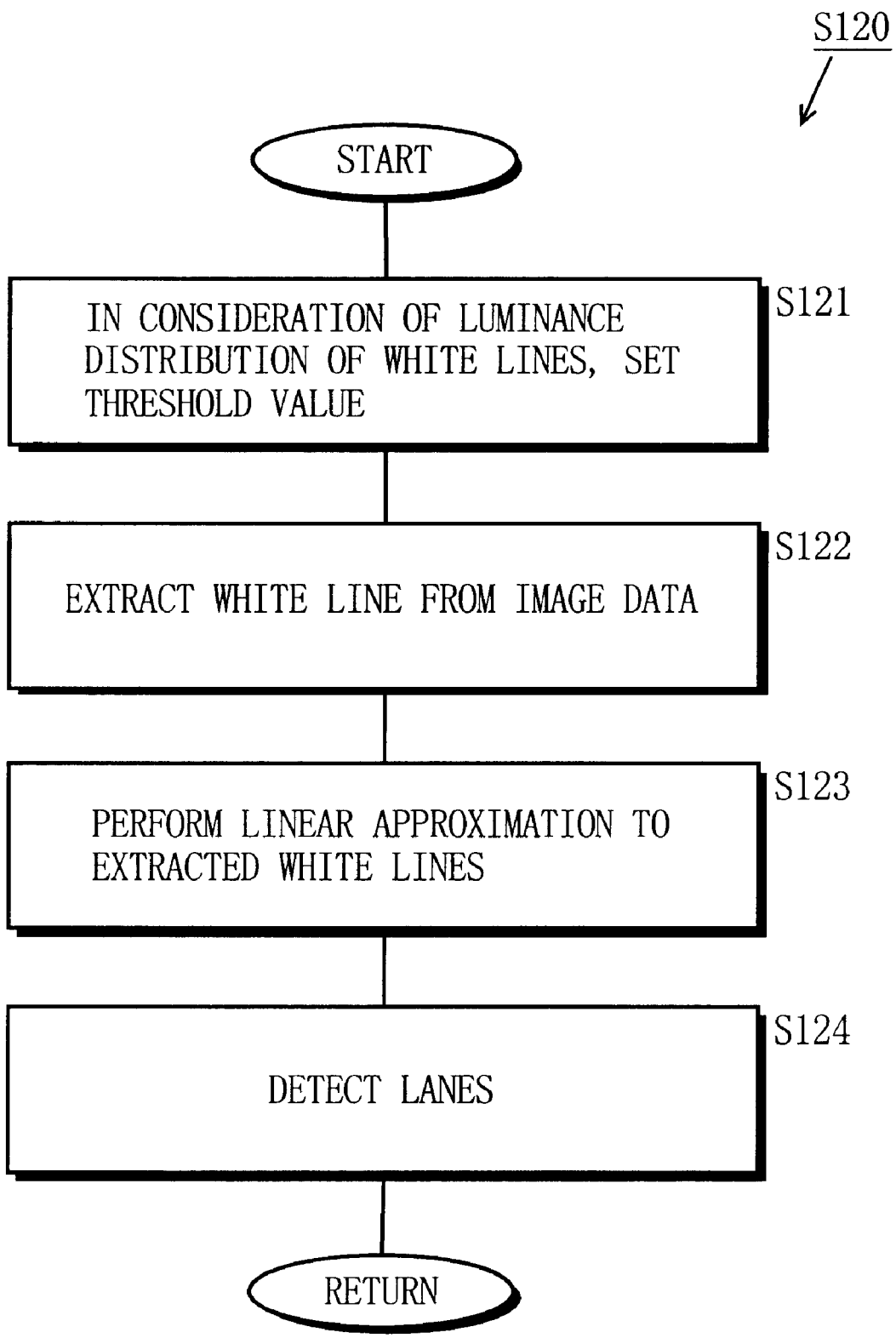
FIG. 6 is a flowchart showing the detailed process of subroutine step S120.

In step S121 of FIG. 6, as for the received image data, the obstacle detection part 8 detects a maximum luminance in a predetermined region thereof. With reference to thus detected maximum value, and in consideration of luminance distribution, the obstacle detection part 8 sets a threshold value considered optimal for detection of the white line.

In step S122, the obstacle detection part 8 searches the image for any pixel exceeding the threshold value. This is done on the basis of pixel line, which is drawn between two predetermined pixels on the image data, for example, from a center pixel on the far left column to that on the far right column. Any consecutive pixels all exceeding the threshold value are regarded as a part of white line. In such manner, the image data is thoroughly searched, and white lines are appropriately extracted therefrom. Here, edge extraction is also a possibility by using an edge extraction filter such as SOBEL filter.

In step S123, for linear approximation, the obstacle detection part 8 sets a processing region wherein thus extracted white lines are observed. For the linear approximation, for example, a HOUGH transform algorithm is used. As a result, the white lines appear linear on the image data.

In step S124, the obstacle detection part 8 detects, as a lane, a triangle region formed by any two adjacent white lines and the bottom side of the image. Assume here that two or more lanes are to be detected.

Next, in subroutine step S130 of FIG. 5, the obstacle detection part 8 extracts any vehicle region from the image data received from the external monitor part 7. Here, the vehicle region is typically defined by a closed curve, which is considered a vehicle's contour. Here, for easy understanding, a vehicle having the present navigation device mounted thereon is referred to as simply as "vehicle", and others observed therearound are as collectively "nearby vehicle". The vehicle region is assigned a unique vehicle ID, thus even if plurally extracted, each vehicle region can be uniquely identified thereby. This subroutine step S130 is described in more detail below with reference to FIG. 7.

Figure 7:
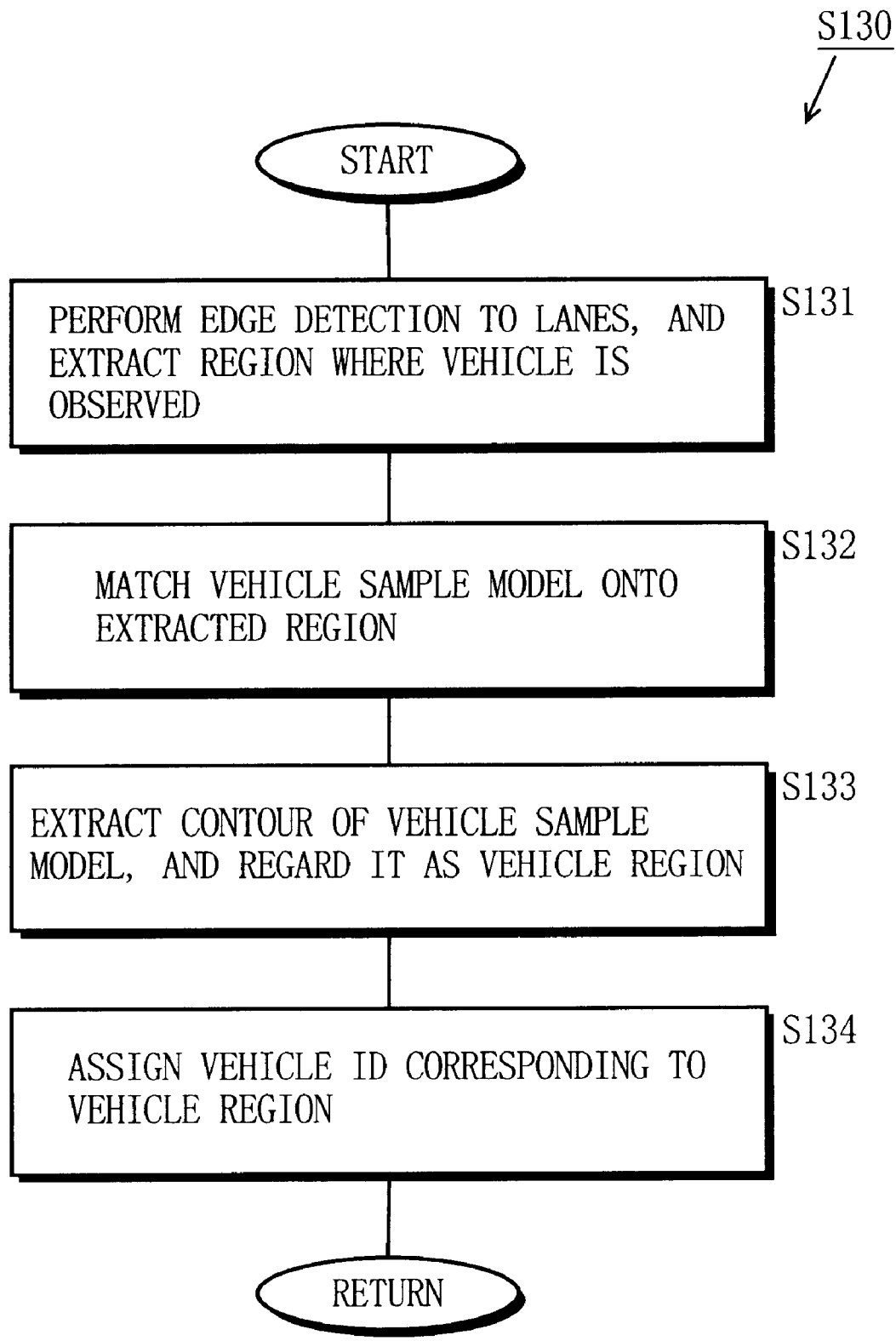
FIG. 7 is a flowchart showing the detailed process of subroutine step S130.

In step S131 of FIG. 7, with respect to each of the lanes detected instep S124, the obstacle detection part 8 performs edge detection, and extracts any region wherein the nearby vehicle is observed. To be specific, first detected from the image are typically horizontal and vertical edges, and around a rectangular region defined thereby, tangent lines are drawn for extraction.

In step S132, the obstacle detection part 8 searches vehicle sample model database (not shown) for a most-analogous vehicle model for overlay onto thus extracted rectangular region. If found, the obstacle detection part 8 overlays the most-analogous vehicle model onto the extracted region in such manner as to coincide both barycenters.

In step S133, the obstacle detection part 8 extracts the contour of the most-analogous vehicle model, and thus extracted region within the contour is the vehicle region.

In step S134, the obstacle detection part 8 assigns the vehicle region a unique vehicle ID, which is utilized as a part of the external information.

In step S140 of FIG. 5, based on the vehicle region on the image, the obstacle detection part 8 determines where the nearby vehicle is on which lane. Then, detected are relative distance, relative velocity, and relative acceleration to the vehicle. Here, with an active sensor such as laser radar, it is easy to measure where the nearby vehicle is, but with a camera, it requires additional processing varied in manners. In this example, two cameras are used to capture object images, and the actual distance to the object is calculated, under principle of triangular measurement, by utilizing parallax between those two images. This subroutine step S140 is described in more detail with reference to FIG. 8.

Figure 8:
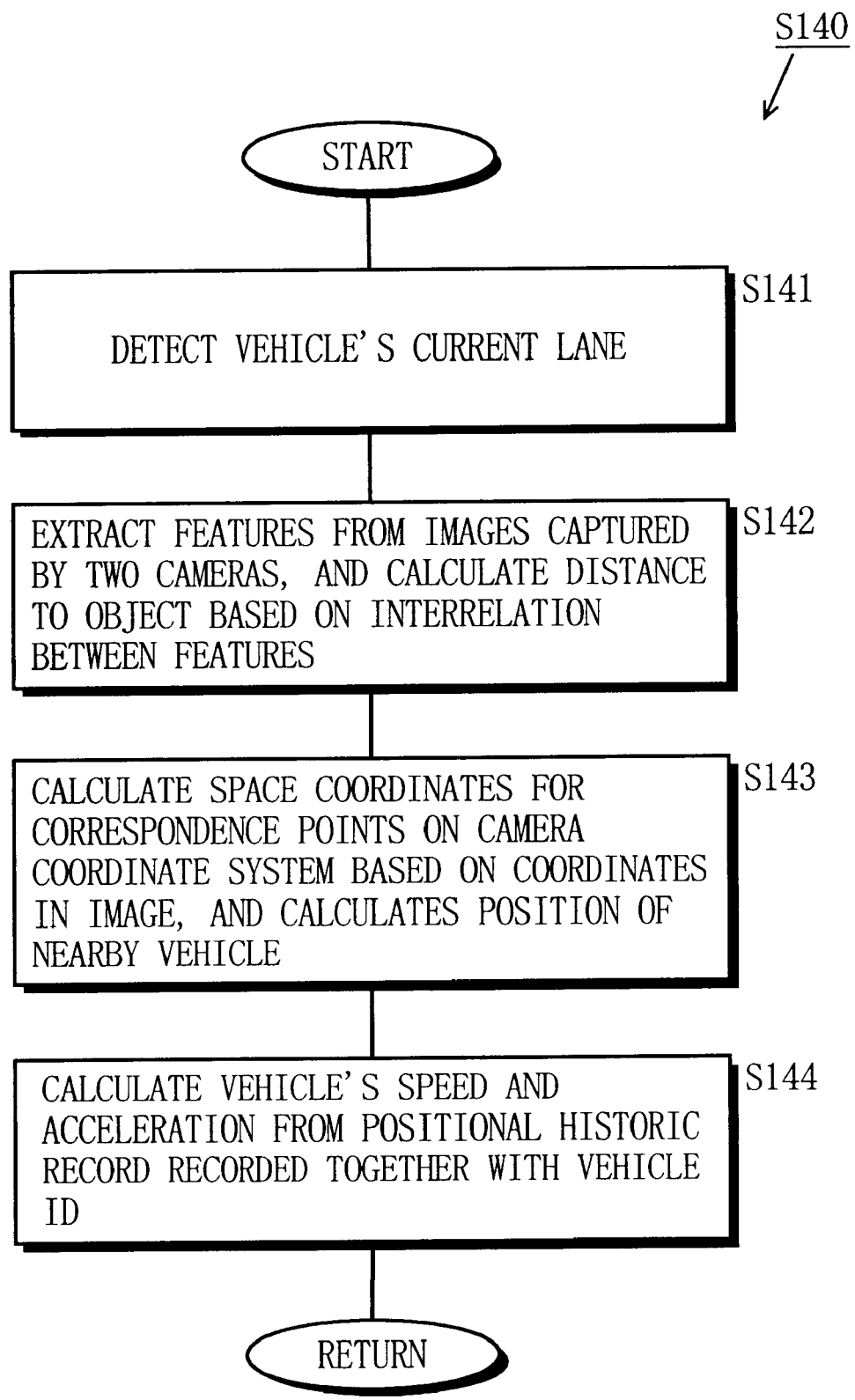
FIG. 8 is a flowchart showing the detailed process of subroutine step S140.

In step S141 of FIG. 8, the obstacle detection part 8 detects on which lane the nearby vehicle currently is. This detection is done based on the lanes detected in step S124.

In step S142, the obstacle detection part 8 first extracts any feature from each of those two object images to know the correspondence therebetween. Here, the feature is, for example, an edge or a vertex of a polyhedron. Then, with thus extracted features, correspondence points are searched for using epipolar constraint. From this pair of correspondence points, a parallax d is first measured, and then the distance D is calculated by the following equation (1).

$$D=L*f/d \qquad (1)$$

where L denotes the distance between those two cameras, and f denotes a focal distance.

In step S143, from the distance D calculated in step S142, the obstacle detection part 8 calculates space coordinates on a camera coordinate system for the correspondence points so as to calculate the position of the nearby vehicle. The resulting position is temporarily stored as a historic record typically with its vehicle ID and the time of calculation.

In step S144, with reference to the historic record, the obstacle detection part 8 calculates the speed and acceleration of the nearby vehicle. Here, the guiding part 11 may alternatively perform such calculation. Thus calculated nearby-vehicle's position, speed, and acceleration are included in the external information together with its corresponding vehicle ID.

Next, in step S150 of FIG. 5, as for the nearby vehicle, the obstacle detection part 8 determines the vehicle type thereof by taking the vehicle region into consideration. Typically, to determine the vehicle type, the obstacle detection part 8 performs matching, in shape and size, among the vehicle region and vehicle sample model in database (not shown). If the distance to the nearby vehicle can be approximately measured from the size of the vehicle region, the processing in step S140 may be omitted. Thus determined vehicle type is also included in the external information together with its corresponding vehicle ID.

In step S160, the obstacle detection part 8 refers to the vehicle region to see if the nearby vehicle carries any sign calling for the driver's attention (hereinafter, referred to as "with-care" sign). Exemplified for such with-care sign is a "not-yet-skilled sign", which is obligatory for a driver who just got his/her driver's license for a certain time period. The with-care sign reminds the drivers to be attentive to the vehicle carrying the same, and for easy recognition, each predetermined in shape and color. Accordingly, the obstacle detection part 8 first extracts, from the vehicle region, any part having the same color as any existing with-care signs. Then, the extracted part is compared in shape with templates which are of the existing with-care signs previously provided, and then finds the one uniquely corresponding to any specific with-care sign. Then, the result obtained thereby is included in the external information together with the applicable vehicle ID.

In step S170, the obstacle detection part 8 refers to the vehicle region if the blinkers of the nearby vehicle is on, and if so, whic[0088] sid[0085] of th[0085] blinkers is flashin on an[0084] off. Here, since the blinker is also predetermined in color as are the with-care signs, the processing in step S160 can be executed to make such determination. Alternatively, executed may be processing of extracting any flashing region from a plurality of images which have been captured at predetermined time intervals. The result obtained thereby is included in the external information together with the applicable vehicle ID.

In step S180, the obstacle detection part 8 determines whether or not the image is thoroughly detected for every vehicle region. If not yet, the procedure returns to subroutine step S130, otherwise, this is the end of the processing. Note that, the processing of FIG. 5 is repeated at regular intervals to continually monitor the circumstances around the vehicle.

After going through such processing, the external information is generated for every vehicle ID and read into the guiding part 11. This is the end of processing in step S541 of FIG. 4.

Next, in step S542, the guiding part 11 refers to the external information to determine whether or not there is any with-care vehicle around the vehicle. Here, any nearby vehicle is regarded as a with-care vehicle if seems dangerous in consideration of its vehicle type, speed, distance to the vehicle, driving manner, and the like. As typical examples, with respect to the vehicle, a with-care vehicle is any nearby vehicle (motorcycle included) rapidly approaching, staying behind, putting its blinker flashing on and off, carrying a with-care sign, and moving meanderingly. Emergency vehicles are also included, for example.

Such with-care vehicles are easily recognizable by utilizing the external information. In detail, to recognize any nearby vehicle rapidly approaching or staying behind, utilized are the relative distance, relative velocity, and the relative acceleration to the vehicle detected in step S140 of FIG. 5 with the help of a predetermined equation and table. Similarly, any nearby vehicle moving meanderingly is also easily recognized by first calculating a variation of a motion vector thereof, and then detecting its degree of swinging with respect to the heading direction. Here, as described in the foregoing, the vehicle type is detectable in step S150, the care-with sign in step S160, and the blinker in step S170.

If determined no with-care vehicle is observed, the procedure returns to the processing of FIG. 3. If determined any, the procedure goes to step S543.

In step S543, in consideration of thus detected with-care vehicle, the guiding part 11 decides whether or not the vehicle is in with-care state. Here, any state is regarded as the with-care state if the nearby vehicle is considered a threat to the vehicle. This determination is made based on how the route ahead looks like, whether the vehicle needs to make a right/left turn or decelerate, and the like. If determined that the vehicle is not in the with-care state, the procedure returns to the processing of FIG. 3. If determined Yes, the procedure goes to step S544.

Here, exemplarily described here is the interrelation between the with-care vehicle and the with-care state. FIG. 9 is a schematic table showing such interrelation. In the table, values "0" denote "basically no threat", and values "1" denote "threat". Although this table is exemplified for countries where vehicles drive on the right (e.g., Japan), but becomes applicable to countries where vehicles drive on the left only by switching between "right" and "left".

In FIG. 9, shown by the column of the table are attributes relevant to the threat type of the with-care vehicle. To be specific, the with-care vehicle is defined as approaching the vehicle, its blinker is on, carrying any with-care sign, moving meanderingly, and by vehicle type other than vehicle such as motorcycle and emergency vehicle. If the with-care vehicle is defined as approaching, the table further indicates from which lane the with-care vehicle is approaching, specifically, from the right lane, the left lane, or right behind the vehicle. Similarly, if the with-care vehicle is defined as putting its blinker on, the table further indicates which side of the blinkers is flashing on and off.

Shown by the row of the table are various with-care states, specifically, if the vehicle needs to move to a right/left lane, make a right/left turn, or brake or decelerate, and if the route ahead is narrowed or curved, and if so, in which side.

Here, for easy prediction if the route ahead is narrowed or curved, the map data in the map data storage part 3 may be referred to only for a certain range of the route selected by the route selection part 10. As such, by knowing in advance what the route ahead looks like, the vehicle can be ready for other nearby vehicles' possible behaviors, for example, lane change and sharp turn.

Further, for easy prediction if the vehicle is changing lanes, making a right/left turn, braking, or decelerating, realtime monitoring of the vehicle's current position, steering wheel, accelerator, brake, and the like, will do. Similarly, realtime monitoring of the vehicle's blinker helps predict to which lane the vehicle moves next. Further, the route selected by the route selection part 10 is analyzed to know the vehicle's possible behavior.

FIG. 9 shows, for example, if there is any nearby vehicle approaching from right lane, collision is considered possible if the vehicle moves to the right lane or makes a right turn. Therefore, applicable boxes in the table all show "1". Similarly, in the case that the route selected by the route selection part 10 is narrowed ahead and the right lane is ended, any nearby vehicle approaching from right lane may aggressively move into the same lane and thus collision is considered likely. Also in the case that the route is curved to the right with a certain curvature and more, any nearby vehicle driving fast on the right lane may slide therearound into the same lane. Accordingly, applicable boxes in the table all show "1".

When there is any nearby vehicle approaching from behind, there seems no harm if the vehicle makes a right/left turn. However, the driver usually decreases the vehicle's speed to make a right/left turn. Therefore, depending on the vehicle's relative position, relative velocity, and relative acceleration to the nearby vehicle, collision is considered likely. Thus, applicable boxes in the table show all "1". On the other hand, even if any nearby vehicle is approaching on the same lane from behind when the vehicle is stationary, the nearby vehicle is expected to stop and usually do so. Therefore, such case is considered no threat, and thus applicable boxes in the table all show "0".

Considered next is a motorcycle positioning behind the vehicle or on the left lane. When the vehicle makes a left turn, such motorcycle may be easily in the vehicle's blind spot, and thus requires some attention. Also, if the driver of the vehicle opens the left door without paying much attention, the door might hit the motorcycle. Thus, applicable boxes in the table all show "1". Here, alternatively, the driver's hand detected on either door of the vehicle may be possibly considered a threat.

As for the emergency vehicle, the vehicle is expected to give way thereto, and in the course, the emergency vehicle may cause some harm to the vehicle. Thus, applicable boxes in the table all show "1". Here, alternatively, regardless of with-care states, the drive assistant information may be generated whenever the emergency vehicle is detected.

Here, FIG. 9 is by way of example only, and any other various with-care states, with-care vehicles, and combination thereof are surely possible. For example, any nearby vehicle is regarded as a with-care vehicle if changing lanes without putting its blinker on, or continuously increasing and decreasing the vehicle's speed. Also, the obstacle detection part 8 may additionally recognize the nearby vehicle's plate and vehicle type, and if the nearby vehicle is a luxury type, the driver of the vehicle may be warned, and if is found as a stolen vehicle or a wanted vehicle, a call may automatically be made to the police.

In such manner, the interrelation between the with-care vehicle and the with-care state can be measured. Here, FIG. 9 is by way of example only, and thus such generic table is not always necessary if some other techniques are applicable to measure the above interrelation.

To be specific, the above-described threat level correspondingly varies depending on the vehicle's and the nearby vehicle's position, speed, acceleration, making turns or changing lanes, and road shape, road surface condition, and the like. Therefore, from such interrelation, derived is a predetermined equation or a complex conditional expression with various imaginable cases given into consideration. By using such equation or complex expression, the interrelation between the with-care vehicle and the with-care state can be measured.

As such, in step S543 of FIG. 4, the guiding part 11 decides whether or not the vehicle is in with-care state in consideration of the with-care vehicle.

Next, in step S544, to deal with the with-care vehicle, th[0085] guidin part 11 generates drive assistant information. Here, the drive assistant information is typically used to arrange an image of the with-care vehicle onto the map image for display.

Figure 10:
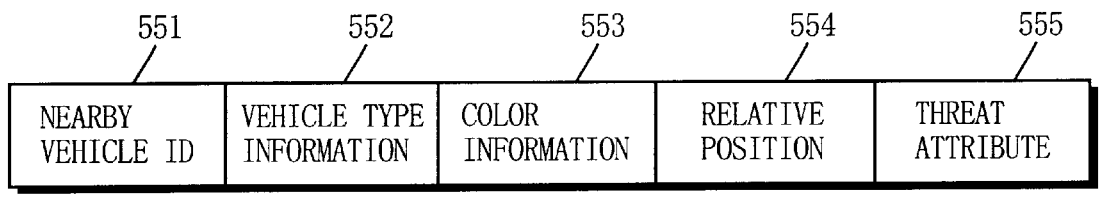
FIG. 10 is a schematic diagram exemplarily showing what drive assistant information carries therein.

FIG. 10 is a schematic diagram showing what the drive assistant information carries. In FIG. 10, the drive assistant information includes a nearby vehicle ID 551, vehicle type information 552, color information 553, relative position 554, and one or more attributes relevant to threat level (hereinafter, threat attributes) 555. The nearby vehicle ID 551 is an identification number uniquely assigned to each nearby vehicle for identification. The vehicle type information 552 and the color information 553 are determined based on the external information detected by the obstacle detection part 8. Here, the vehicle type information 552 and the color information 553 are mainly used for image display, and thus not necessarily included. Also, the relative position 554 is also not always necessary if the navigation device warns the driver only by sound without display on the map image.

Here, the threat attributes 555 are the ones selectively determined by the guiding part 11 as harmful in consideration of the interrelation between the with-care vehicle and the with-care state (for example, the value "1" in the table of FIG. 9).

Note that, when the guiding part 11 selectively determines as such, the with-care state determined in step S543 is not the only concern. For example, if the vehicle changes lanes to make a turn while decreasing its speed, the vehicle is in three types of with-care states. In such case, selected are every possible threat attribute in consideration of the interrelation among those with-care states and with-care vehicles.

Further, the with-care vehicle may accompany several threat attributes. As an example, if a nearby vehicle with a with-care sign is meanderingly approaching, the number of threat attributes is at least three. In such case, selected are every possible threat attribute relevant to the with-care vehicle.

As such, in step S544, the guiding part 11 selectively determines every possible threat attribute for a certain with-care vehicle by taking every known with-care state into consideration, and correspondingly generates drive assistant information.

Next, in step S545, the guiding part 11 refers to the external information to determine if there is any other with-care vehicle. If determined Yes, the procedure returns to step S543 and repeats the same processing as above until the drive assistant information is generated for every with-care vehicle. If determined No, the procedure returns to the processing of FIG. 3, and goes to step S55.

Figure 11:
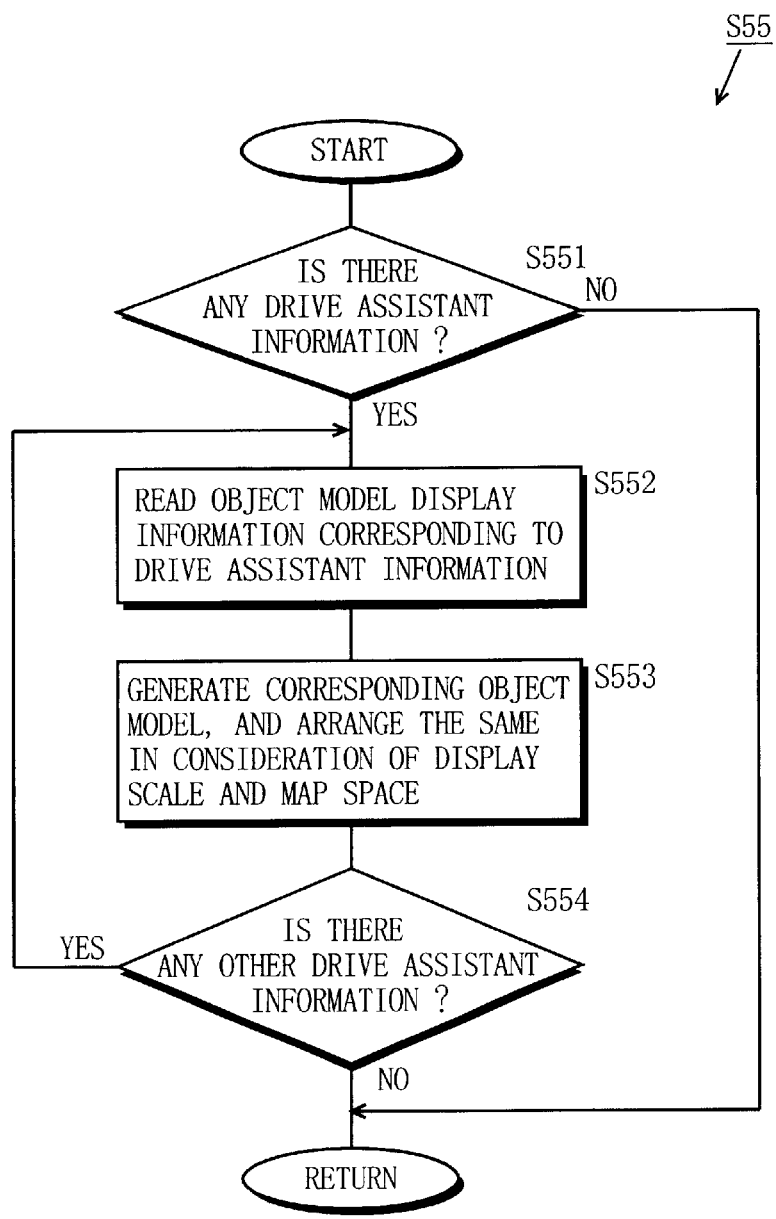
FIG. 11 is a flowchart showing the detailed process of subroutine step S55.

FIG. 11 is a flowchart showing the detailed process of subroutine step S55 of FIG. 3. In step S551 of FIG. 11, the map data arranging part 4 determines whether or not there is the drive assistant information generated by the guiding part 11 in subroutine step S54. If determined No, the procedure returns to the processing of FIG. 3, otherwise goes to step S552.

In step S552, the map data arranging part 4 reads, from the object model display information storage part 6, object model display information corresponding to certain drive assistant information. Here, the object model display information is used to display object models corresponding to the with-care vehicle and its threat attributes.

In step S553, the map data arranging part 4 creates an object model corresponding to thus read object model display information, and dimensionally appropriately arranges the object model on a map image in consideration of a display scale and map space. The resulting map image is displayed by the display 5.

Here, the display scale is so set that the vehicle and other with-care vehicles are displayed on the map image with appropriate size and space in consideration of actual relative distance. For example, in the present navigation device, four display scales are provided. The first display scale is used for displaying a map image covering 1.6 to 50 kilometers square, and such map image is called a 3D satellite map. The second display scale is used for a map image covering 100 to 800 meters square, and the map image is generally called a 2D map. A map image for the third display scale covers 25 to 100 meters square, and is called a virtual city map. A map image for the fourth display scale covers 25 to 50 meters square, and is called a front view map. In the virtual city map and the front view map among those four, the vehicle and the with-care vehicles look appropriate in size. Those four maps are generally switched there among as appropriate. Accordingly, the drive assistant information is presented with higher accuracy to the driver of the vehicle in easy-to-see manner.

Here, the display scale is not limited to those four, and may be continuously changed so that the vehicle and the with-care vehicles look always appropriate in space thereamong. After setting the display scale as such, another processing is carried out to arrange thus created object model on the map image for display. The details thereof are left for later description.

In step S554, the map data arranging part 4 determines whether or not there is other drive assistant information generated by the guiding part 11. If determined No, the procedure returns to the processing of FIG. 3. If Yes, the procedure returns to step S552 to repeat the same processing until every drive assistant information is thoroughly displayed.

Figure 12:
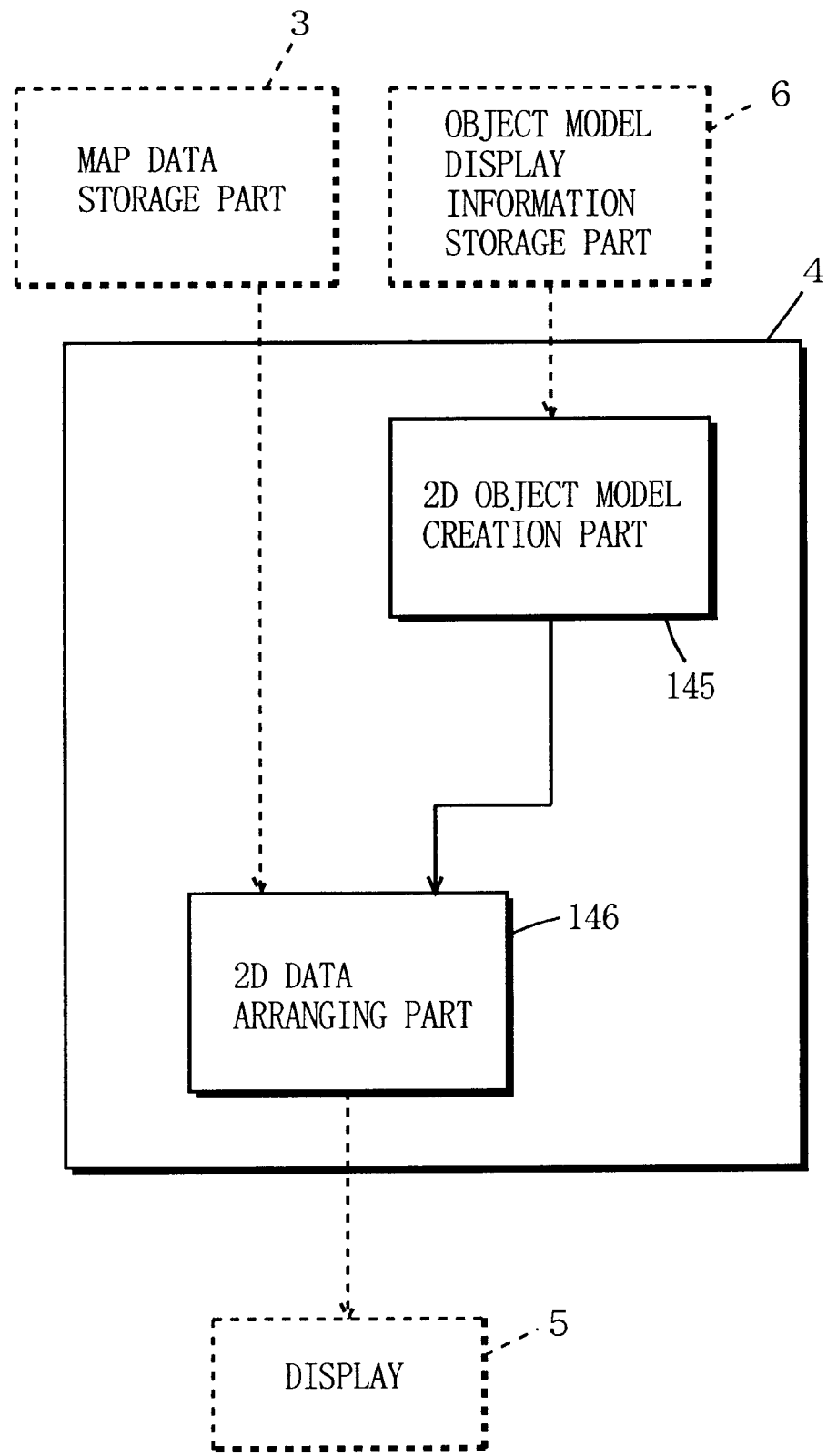
FIG. 12 is a block diagram showing the detailed structure of a map data arranging part 4, a resulting map image generated thereby is of 2D landscape.

Described next is step S553 of FIG. 11 about how the map data arranging part 4 generates a map image. First, described is a case where a resulting map image is of a 2D landscape. FIG. 12 is a diagram showing the detailed structure of the map data arranging part 4 for such case. In FIG. 12, the map data arranging part 4 includes a 2D object model creation part 145, and a 2D data arranging part 146.

Figure 13:
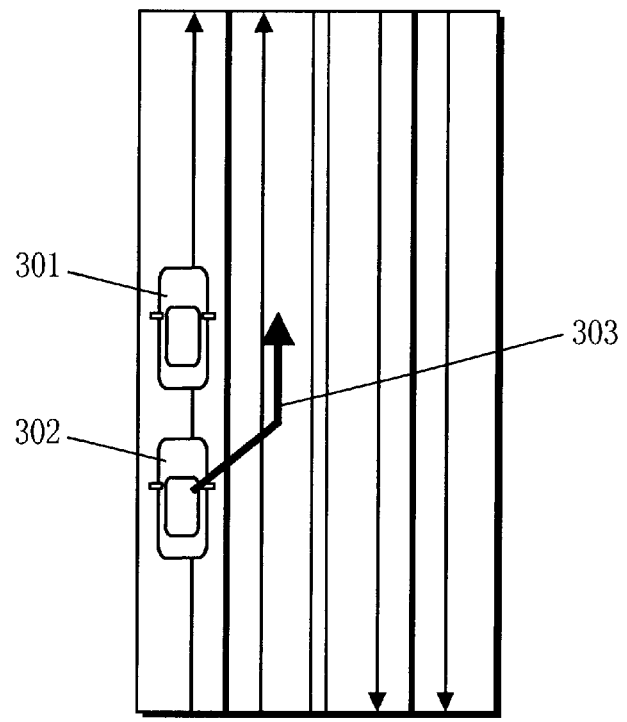
FIG. 13 is a schematic diagram showing an exemplary map image displayed on a display 5.

The 2D object model creation part 145 receives the object model display information from the object model display information storage part 6, and creates a 2D object model. The 2D data arranging part 146 receives thus created 2D object model and 2D map data from the map data storage part 3, and generates a map image by arranging those in accordance with 2D coordinates included in each of those. FIG. 13 is a schematic diagram exemplarily showing an exemplary map image displayed as such on the display 5.

In FIG. 13, on a road with two lanes each in the 2D map image, arranged are a vehicle object model 301, a nearby vehicle object 302, which is regarded as a with-care vehicle, and an arrow object model 303, which corresponds to the threat attribute. Here, the vehicle type and color of the nearby vehicle object 302 are preferably displayed according to the drive assistant information. The nearby object model 302 may be emphatically displayed to indicate the nearby vehicle is the with-care vehicle. For example, the nearby object model 302 may be in red, flashing on and off, and changing colors. Any manner will do as long as the driver is warned thereby.

Assume here that the with-care vehicle is putting its front right blinker on, and the vehicle is also about to move to the right lane. In such case, as described in FIG. 9, collision between those two vehicles is likely. Therefore, to warn the driver of the vehicle that the with-care vehicle behind is moving to the right, such arrow object model 303 as shown in FIG. 13 is displayed.

Here, even if the nearby vehicle is approaching from the right lane, as shown in FIG. 9, the nearby vehicle is considered no threat unless the vehicle moves to the right, makes a turn, and the road is narrowed on the right side or curved to the right. As such, if the nearby vehicle is determined as harmless, no drive assistant information is generated, and thus no arrow object model 303 is displayed.

Figure 14:
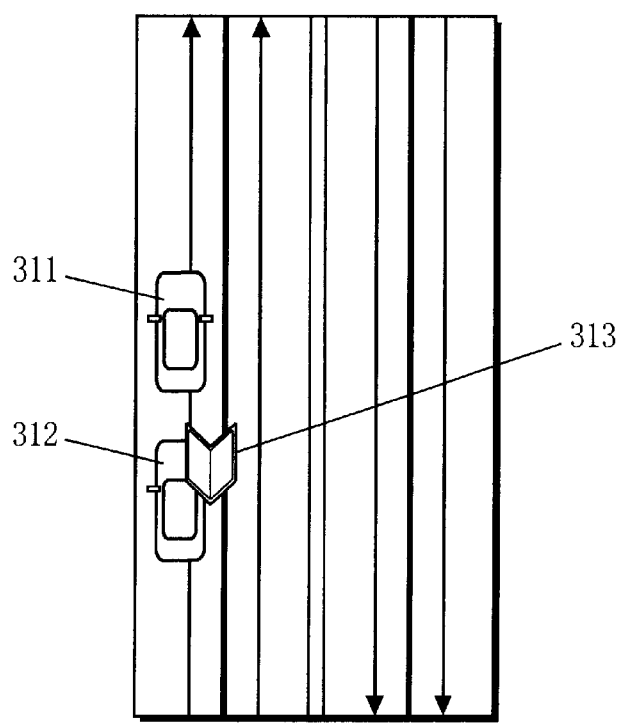
FIG. 14 is a schematic diagram showing another example of map image displayed on the display 5.

FIG. 14 is a schematic diagram exemplarily showing another example of map image displayed on the display 5. In FIG. 14, arranged on the road are a vehicle object model 311, a nearby vehicle object model 312, which is regarded as a with-care vehicle, and a with-care sign object model 313, which corresponds to the threat attribute. Assume here that the vehicle is about to make a left turn and the with-care vehicle therebehind carries a with-care sign. In such case, there seems some threat, and thus such with-care sign object model 313 as shown in FIG. 14 is displayed to warn the driver of the vehicle that the with-care vehicle behind is with the with-care sign.

Figure 15:
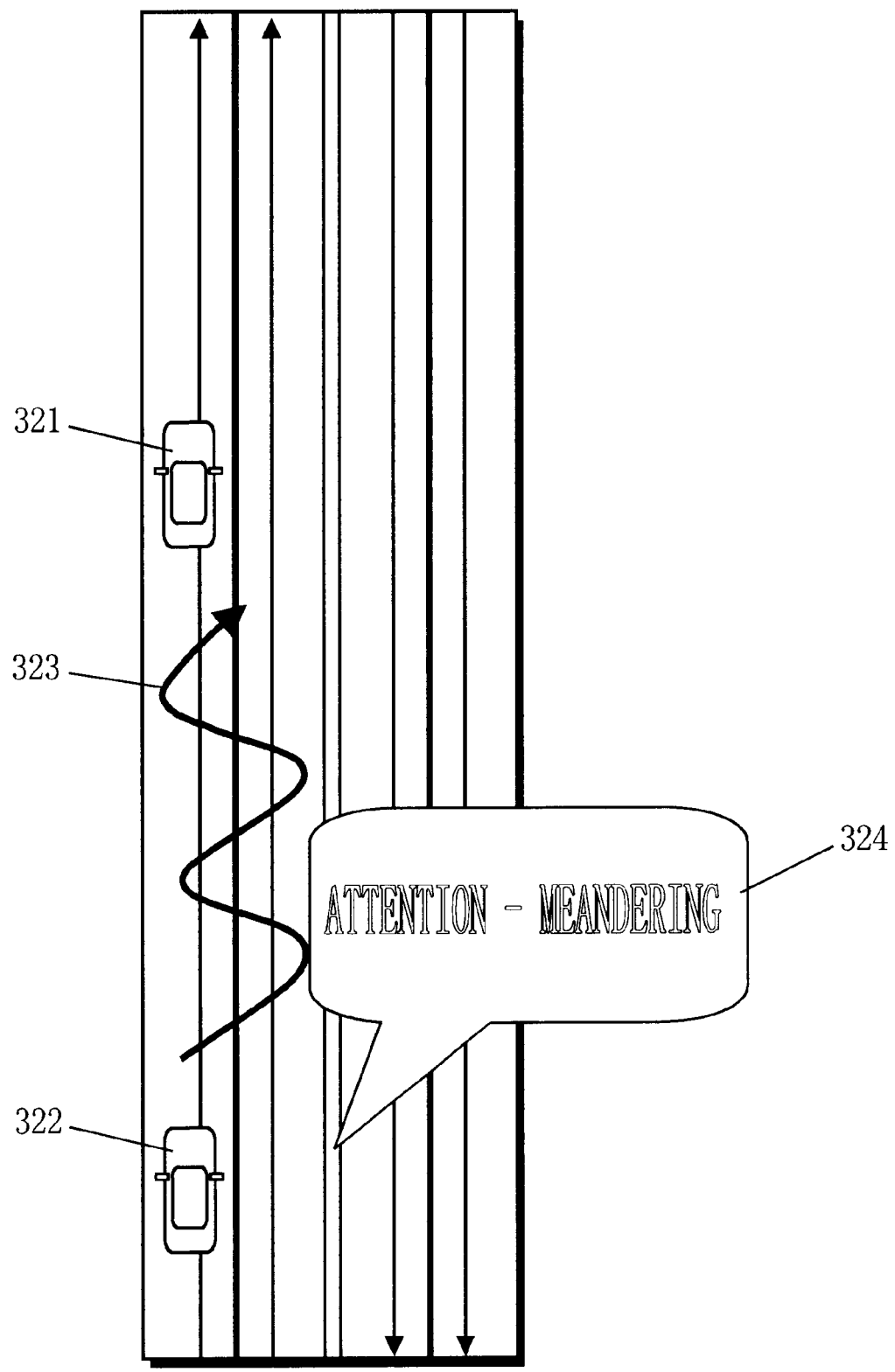
FIG. 15 is a schematic diagram showing still another example of map image displayed on the display 5.

Here, the threat attribute may be indicated in plurality for the nearby vehicle object model, and two or more object models may be provided to indicate one threat attribute. FIG. 15 is a schematic diagram exemplarily showing still another example of map image displayed on the display 5. In FIG. 15, arranged on the road are a vehicle object model 321, a nearby vehicle object model 322, which is regarded as a with-care vehicle, a meandering sign object model 323 and a speech bubble object model 324, both of which correspond to the threat attribute. Assume here that the vehicle is about to make a left turn and the with-care vehicle therebehind is meandering. In such case, there seems some threat, and thus such meandering sign object model 323 and the speech bubble object model 324 as shown in FIG. 15 are displayed to warn the driver of the vehicle that the with-care vehicle behind is meandering. Here, the speech bubble object model 324 has words of warning displayed therein.

As such, by appropriately arranging the vehicle model object and the nearby vehicle object models on a map image, the driver can instantaneously understand the positional relationship thereamong. Also, by creating each appropriate object model for every possible threat attribute, the driver can instantaneously acknowledge its threat level. Accordingly, information offered by the present navigation device can appropriately help, in driving, the driver of the vehicle with higher accuracy.

Described next is a case where a resulting map image generated in the map data arranging part 4 is of a 3D landscape. In such case, there is no need for an object model created from the object model display information and map data stored in the map data storage part 3 to be 3D. Exemplified now is a case where the data provided by the object model display information storage part 6 to the map data arranging part 4 is 3D, and the map data by the map data storage part 3 is 2D, and a resulting map image is of a 3D landscape.

Figure 16:
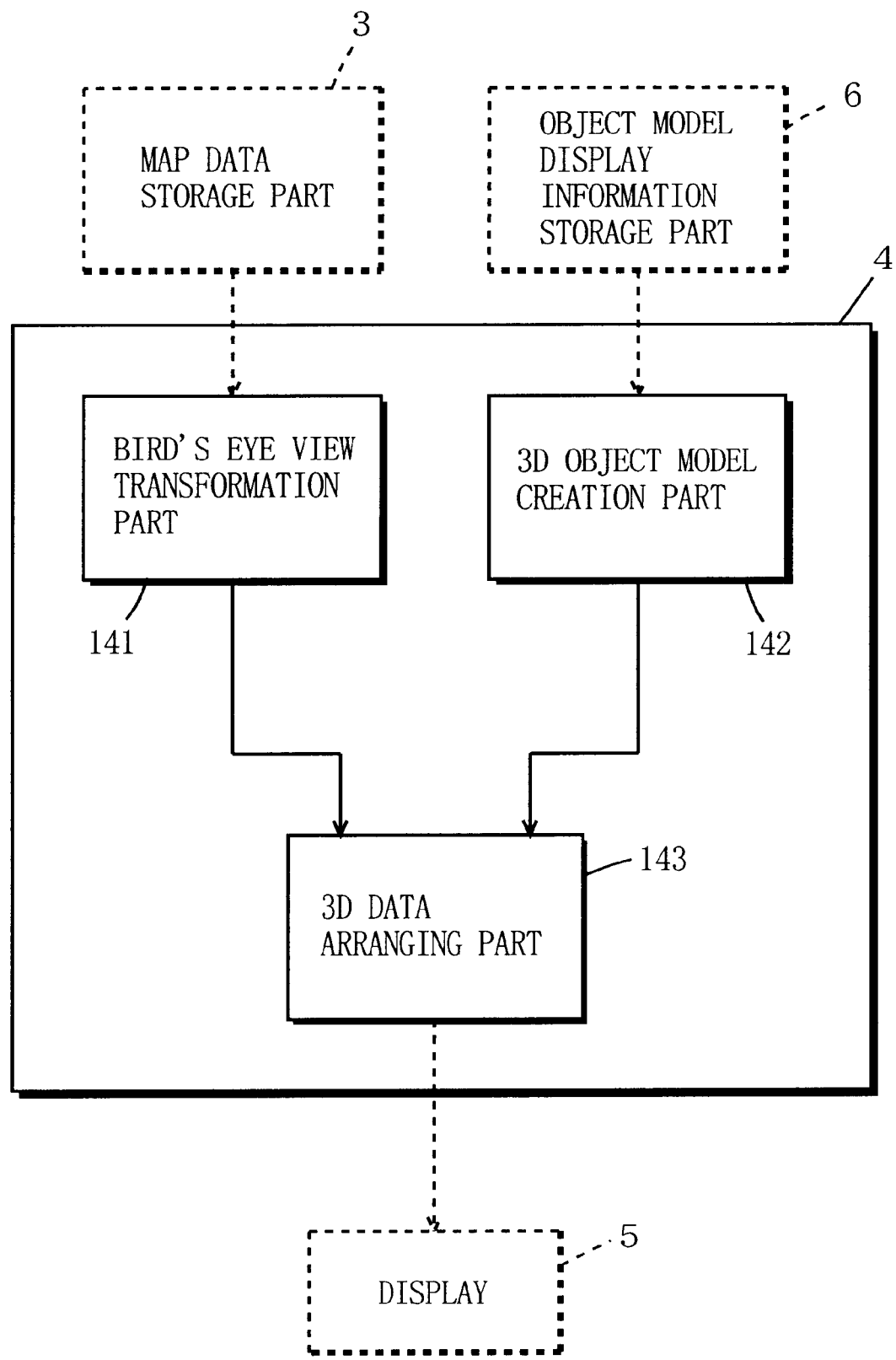
FIG. 16 is a block diagram showing the detailed structure of the map data arranging part 4, a resulting map image generated thereby is of a bird's eye view.

FIG. 16 is a block diagram showing the detailed structure of the map data arranging part 4, which receives 3D data from the object model display information storage part 6 and 2D map data from the map data storage part 3. A resulting map image generated thereby is of a bird's eye view.

In FIG. 16, the map data arranging part 4 includes a bird's eye view transformation part 141, a 3D object model creation part 142, and a 3D data arranging part 143.

The bird's eye view transformation part 141 receives the 2D map data from the map data storage part 3, and then transforms the data to a bird's eye view. A technique for transforming 2D data to a bird's eye view is disclosed in detail in "Development of a Car Navigation System with a Bird's-eye View Map Display" (Society of Automotive Engineers of Japan, Inc, Papers, 962 1996-5), for example. Next below, a technique for transforming 2D data to a bird's eye view is described.

FIG. 17 is a diagram demonstrating a technique for creating a bird's eye view by subjecting 2D map data to perspective transformation. In FIG. 17, a point V(Vx, Vy, Vz) indicates viewpoint coordinates. A point S(Sx, Sy) indicates coordinates of a bird's eye view image on a monitor, and a point M(Mx, My, Mz) indicates coordinates on a 2D map image. Here, since the map data is 2D data, Mz is 0. Points Ex, Ey, and Ez each indicate a relative position to the point M in the viewpoint coordinates system. A reference character θ denotes a look-down angle, while φ indicates a direction angle of viewpoint. A reference character DS indicates a theoretical distance between the viewpoint and the image.

Here, with the viewpoint coordinates V(Vx, Vy, Vz), look-down angle θ, and direction angle φ specified in value, the coordinates S(Sx, Sy) of the bird's eye view image can be calculated with respect to the coordinates M(Mx, My, Mz) on the 2D map image. An equation (2) therefor is as follows:

$$E = \begin{bmatrix} 1 & 0 & 0 \\ 0 & \sin\theta & \cos\theta \\ 0 & -\cos\theta & \sin\theta \end{bmatrix} \begin{bmatrix} \sin\phi & -\cos\phi & 0 \\ \cos\phi & \sin\phi & 0 \\ 0 & 0 & 1 \end{bmatrix} (M - V) \quad (2)$$

$$S = \frac{DS}{-Ez}\begin{pmatrix} Ex \\ Ey \end{pmatrix}$$

With the above equation (2), for example, the bird's eye view transformation part 141 transforms the 2D map data provided by the map data storage part 3 to a bird's eye view. The bird's eye view of 3D data is forwarded to the 3D data arranging part 143.

The 3D object model creation part 142 receives the 3D data, and then creates a 3D object model with the processing in subroutine step S553 of FIG. 11. Thus created 3D object model is forwarded to the 3D data arranging part 143.

Figure 18:
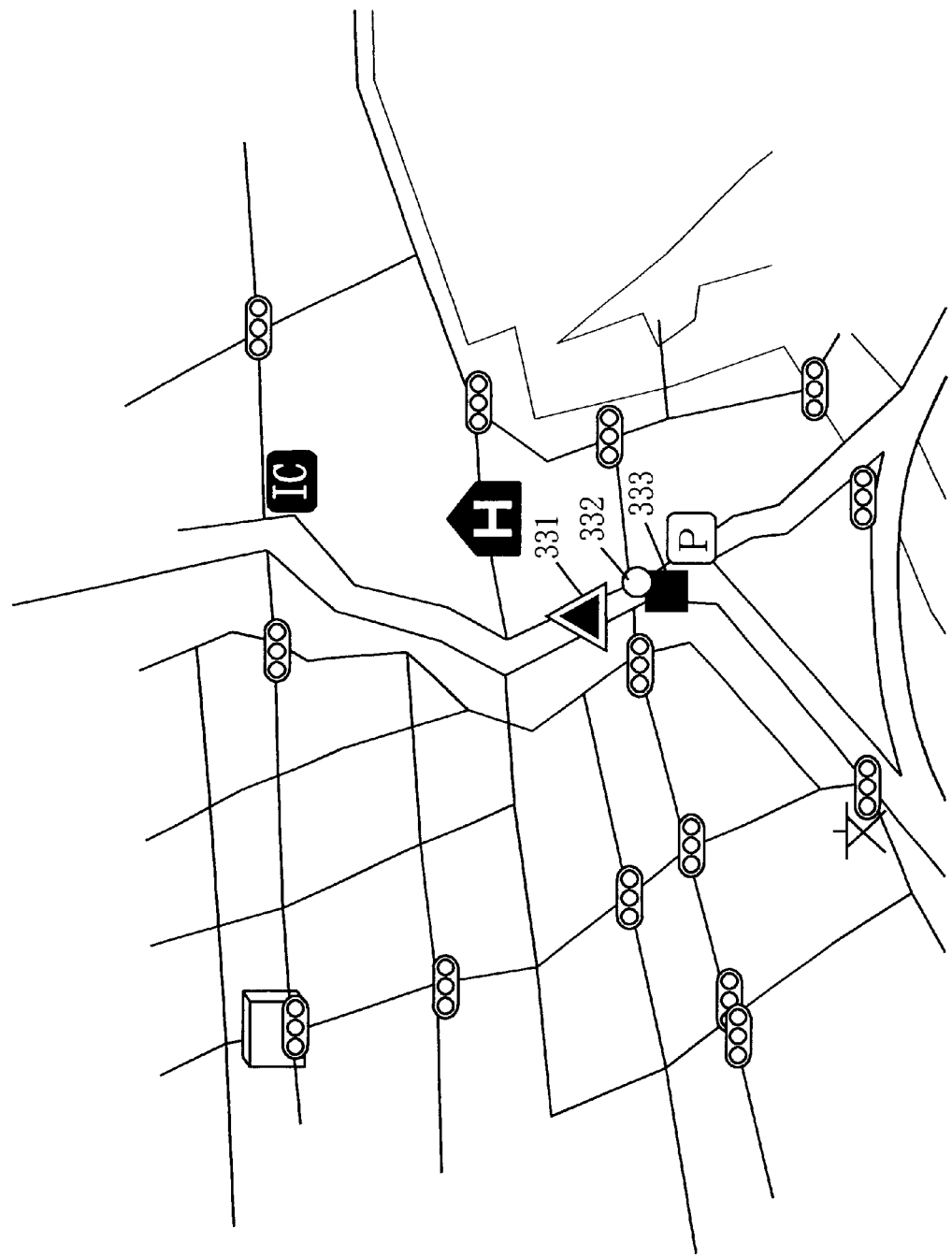
FIG. 18 shows an exemplary map image of a bird's eye view displayed on the display 5.

The 3D data arranging part 143 arranges thus received 3D data and object model data together for output to the display 5. FIG. 18 shows exemplary data thus generated and displayed on the display 5.

In FIG. 18, on the map image of the bird's eye view, there include a vehicle model object 331, a nearby vehicle object model 332, which is regarded as a with-care vehicle, and a with-care sign object model 333, which corresponds to the threat attribute. Assumption made herein is the same as the case of FIG. 14, and thus is not described again. In FIG. 18, presumably, these object models are 3D of a type changing in shape with varying viewpoints even if looked as 2D.

Exemplified now is a case where the data provided by the object model display information storage part 6 is 3D, and the data by the map data storage part 3 is 2D, and a resulting map image is of a 3D landscape, which looks different from the bird's eye view.

Figure 19:
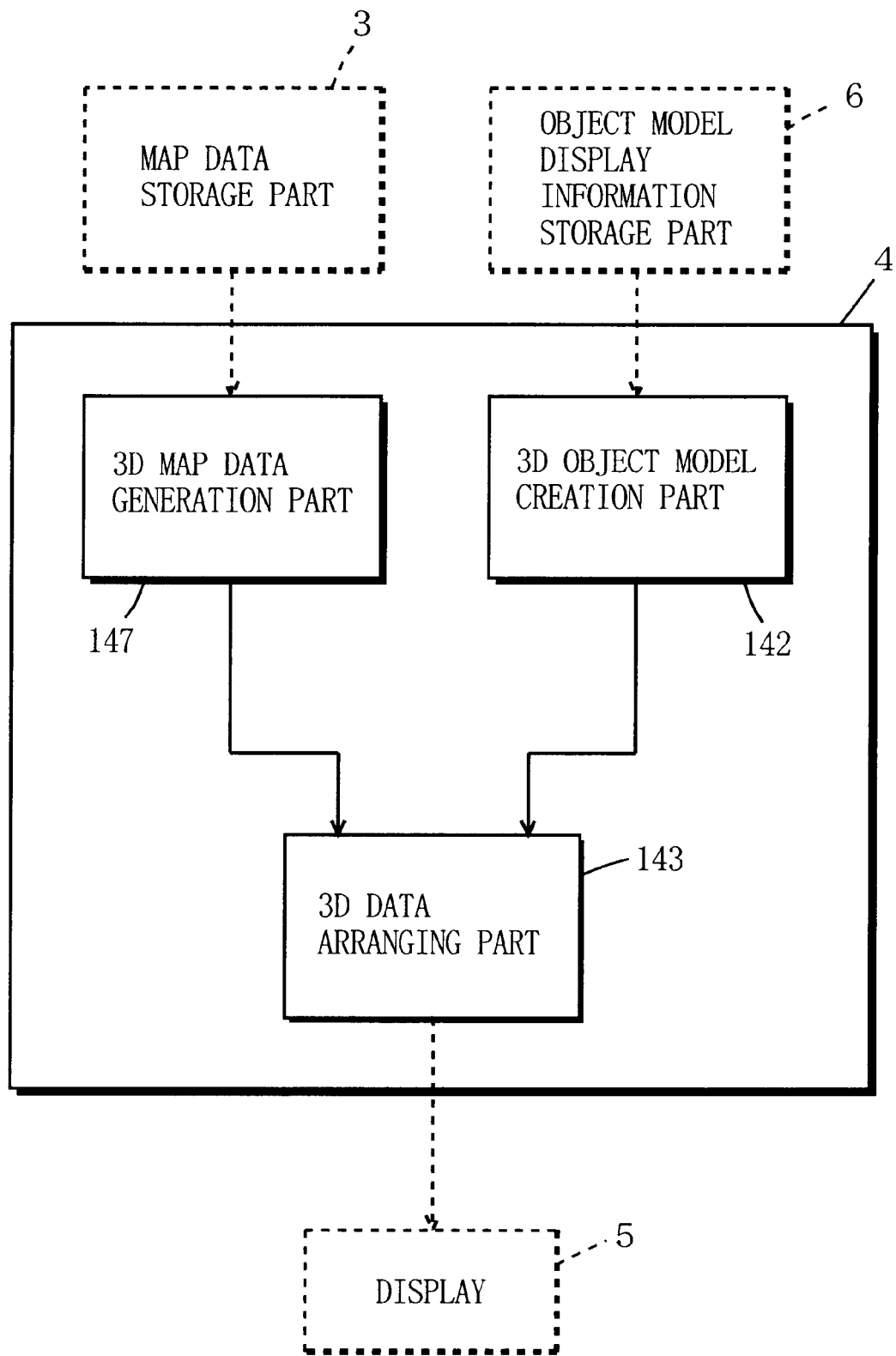
FIG. 19 is a block diagram showing the detailed structure of the map data arranging part 4, a resulting image data generated thereby is of a 3D landscape different from a bird's eye view.

FIG. 19 is a block diagram showing the detailed structure of the map data arranging part 4, which receives 3D data from the object model display information storage part 6 and 2D map data from the map data storage part 3. A resulting map image generated thereby is of a 3D landscape, which is different from a bird's eye view.

In FIG. 19, the map data arranging part 4 includes a 3D map data generation part 147, the 3D object model creation part 142, and the 3D data arranging part 143.

In FIG. 19, the 3D object model creation part 142 and the 3D data arranging part 143 are similar in structure and operation to those in FIG. 16. Thus, the 3D map data generation part 147 is mainly described in structure and operation below.

Figure 20:
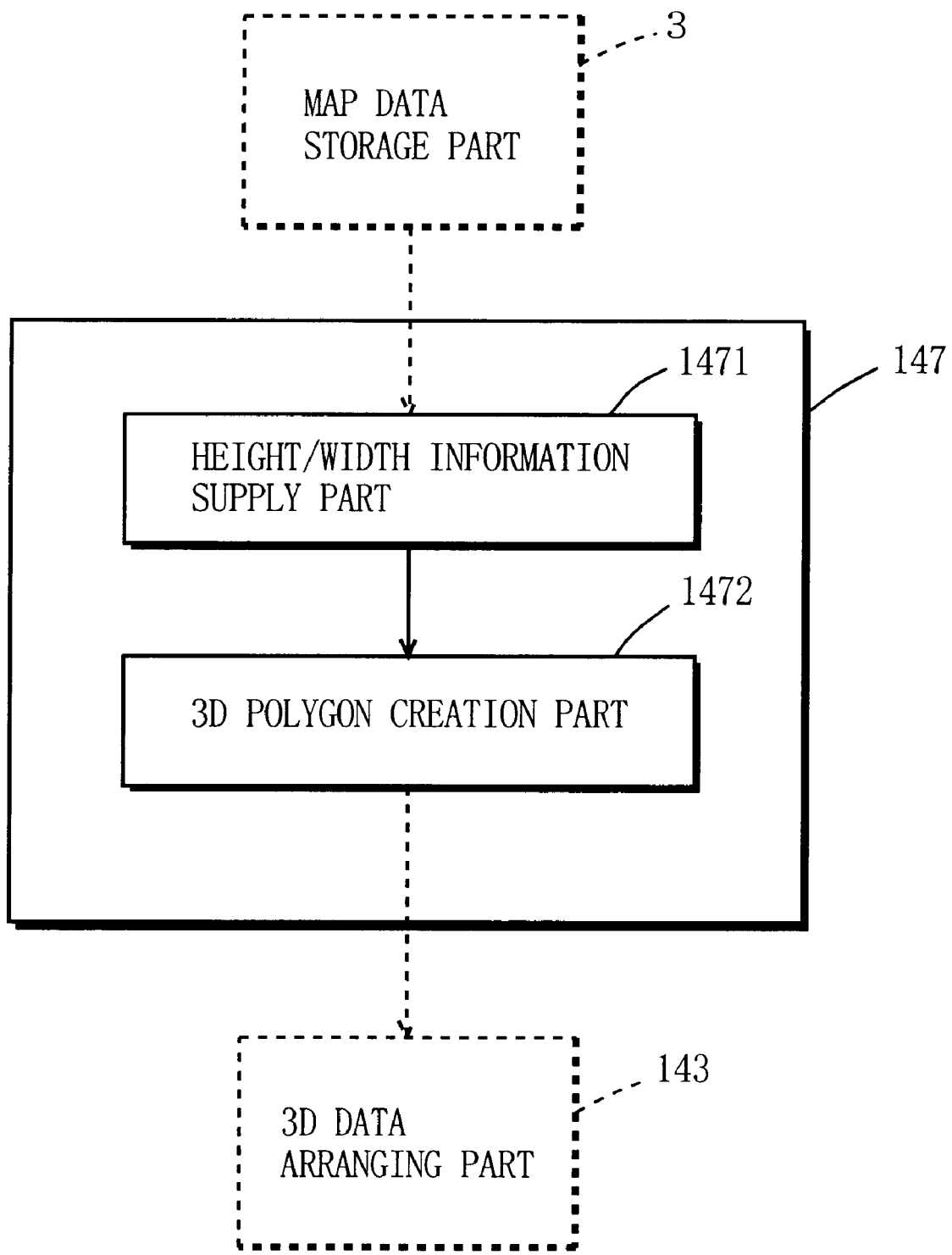
FIG. 20 is a block diagram showing the detailed structure of a 3D map data generation part 147.

FIG. 20 is a block diagram showing the detailed structure of the 3D map data generation part 147. In FIG. 20, the 3D map data generation part 147 includes a height/width information supply part 1471, and a 3D polygon creation part 1472. The height/width information supply part 1471 supplies information about height and width to the 3D polygon creation part 1472 responding to 2D map data provided by the map data storage part 3. The 3D polygon creation part 1472 then creates a 3D object model.

The height/width information supply part 1471 analyzes the 3D shape of a road, for example, with the help of the link type (e.g., side-road link, elevated link) and information about branching node included in the 2D map data, typically by applying a predetermined pattern. With the analyzed result, the height/width information supply part 1471 adds information about height and width to the 2D data of the road, for example, so as to generate 3D map data.

The 3D polygon creation part 1472 receives thus generated 3D map data, and creates a 3D object model with a general technique therefor. In the above manner, the map data arranging part 4 of FIG. 19 generates a map image of 3D landscape, which looks different from a bird's eye view.

Figure 21:
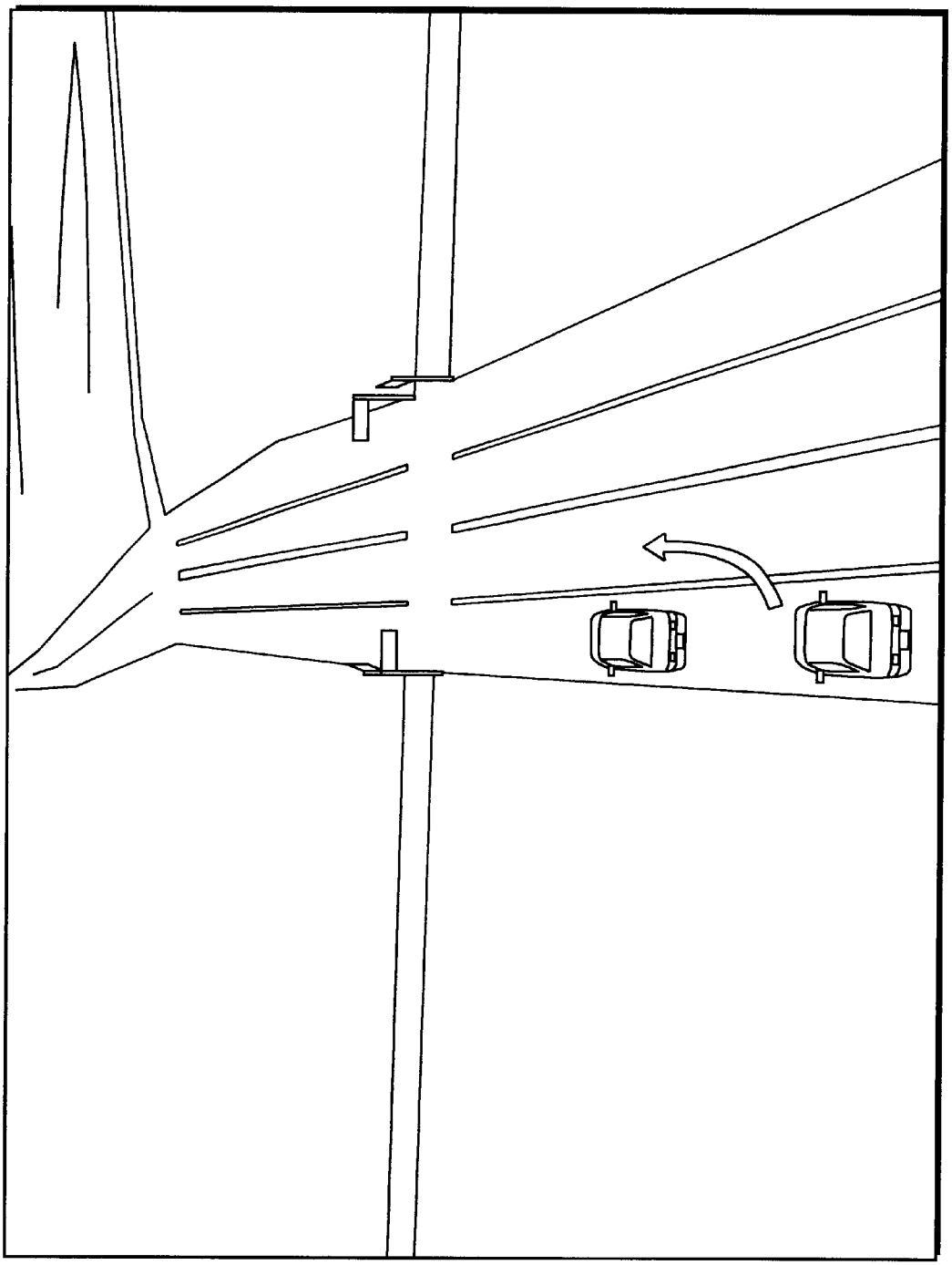
FIG. 21 is a diagram exemplarily showing a case where displayed on the 3D landscape are 3D object models, which indicate a with-care vehicle and its direction being about to make a rightward lane change.

FIG. 21 is a diagram exemplarily showing a case where displayed on the 3D landscape are 3D object models, which indicate a with-care vehicle and its direction being about to move to the right lane. As shown in FIG. 21, by displaying both the nearby vehicle object model moving to the right lane and the arrow object model indicating its moving direction, the driver of the vehicle can intuitively understand what the nearby vehicle behind is about to do.

Exemplified next is a case where the data provided by the object model display information storage part 6 to the map data arranging part 4 is 2D, and the data by the map data storage part 3 is 3D, and a resulting map image is of a 3D landscape.

Figure 22:
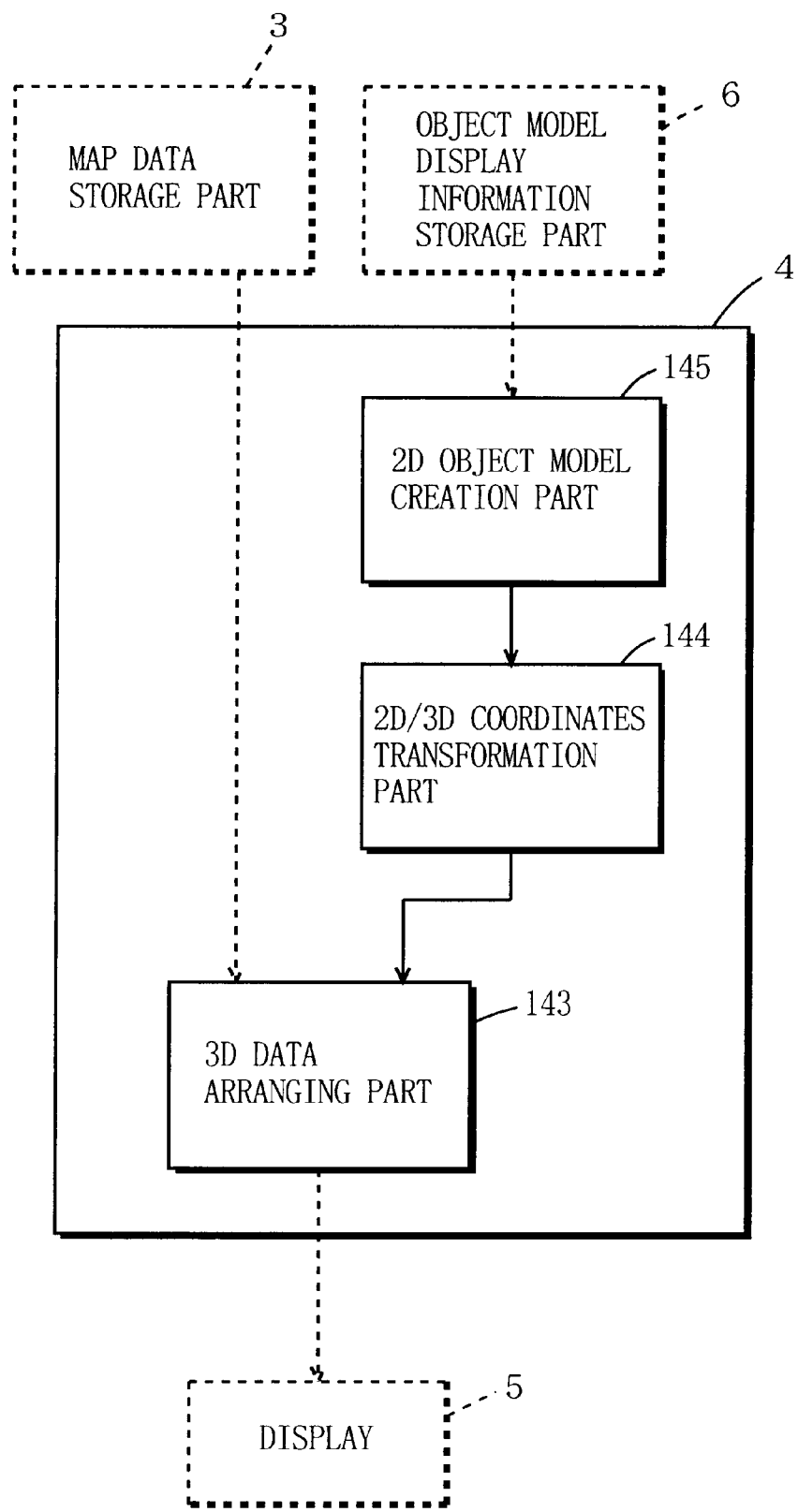
FIG. 22 is a block diagram showing the detailed structure of the map data arranging part 4, which receives 2D data from the object model display information storage part 6 and 3D map data from the map data storage part 3, and generates a map image of 3D landscape.

FIG. 22 is a block diagram showing the detailed structure of the map data arranging part 4, which receives 2D data from the object model display information storage part 6 and 3D map data from the map data storage part 3. A resulting map image generated thereby is a map image of 3D landscape.

In FIG. 22, the map data arranging part 4 includes a 2D object model creation part 145, a 2D/3D coordinate transformation part 144, and the 3D data arranging part 143.

In FIG. 22, the 2D object model creation part 145 receives 2D data from the object model display information storage part 6, and then creates a 2D object model by going through subroutine step S553 of FIG. 11.

To be specific, as already described, a plurality of image files are prepared as 2D shape information included in the object model display information. FIG. 23 is a diagram exemplarily showing several image files prepared as such. In FIG. 23, images are classified into "meandering vehicle", "motorcycle", and "vehicle with with-care sign". Such image type corresponds to the object model display information, and further classified into "close-range", "medium-range", and "long-range".

The 2D object model creation part 145 first determines the image type by referring to the object model display information. The 2D object model creation part 145 then selects a distance range for the determined image type among from those "close-range", "medium-range", and "long-range". Here, as described above, the object model display information includes position information indicating the position of the object model by 3D coordinates. In FIG. 23, selecting a distance range for each image is based on a distance between such 3D coordinates and viewpoint coordinates. Therefore, typically, the 2D object model creation part 145 calculates such distance to determine to which distance range thus calculated distance applies.

As for a resulting 2D object model, the 2D/3D coordinate transformation part 144 transforms 2D coordinates thereof to 3D coordinates based on the corresponding position information. Then, the resulting 3D object data is inputted into the 3D data arranging part 143.

The 3D data arranging part 143 receives 3D map data from the map data storage part 3. The 3D data arranging part 143 then arranges the map data together with the 3D object model data provided by the 2D/3D coordinate transformation part 144 to generate a map image of 3D landscape. Thus generated map image is forwarded to the display 5.

Here, in the map data arranging part 4 as above structured, the 2D object model created by the 2D object model creation part 145 is transformed to 3D data by the 2D/3D coordinate transformation part 144, and then arranged together with the 3D map data in the 3D data arranging part 143. This is not restrictive, and the 2D/3D coordinate transformation part 144 may be omitted, and a 2D/3D image arranging part may be provided as an alternative to the 3D data arranging part 143. If this is the case, the 2D/3D image arranging part pastes a 2D object model created by the 2D object model creation part 145 onto a map image of 3D landscape. In more detail, the 2D/3D image arranging part first generates a map image of 3D landscape by transforming 3D map data to screen coordinates, calculates screen coordinates of a 2D object model, and arranges 2D data as it is on a resulting map image of 3D landscape. With such modified structure, an object model looks the same even if viewed from various positions, and is displayed always the same. Therefore, better viewability is offered.

Figure 24:
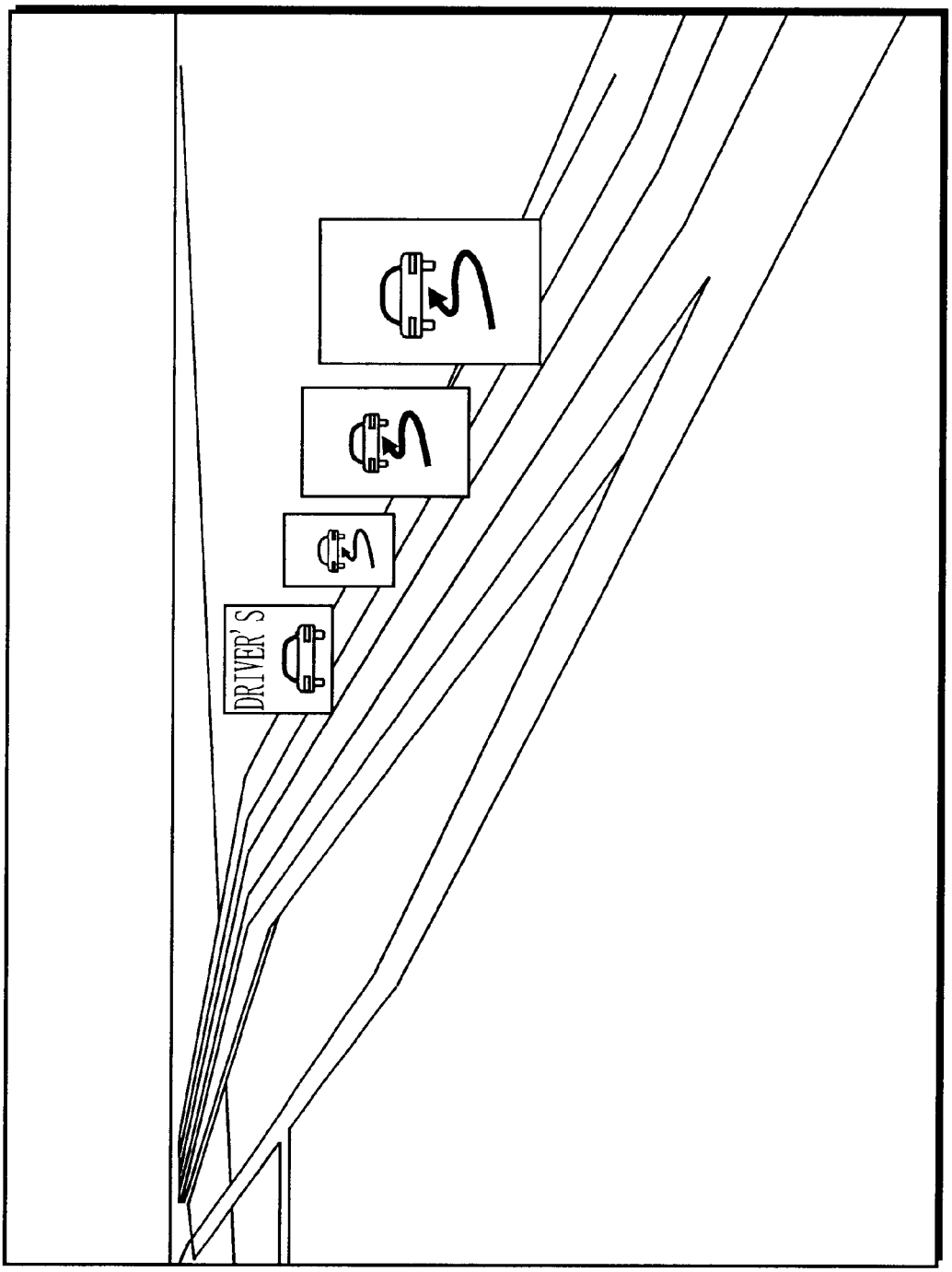
FIG. 24 shows an exemplary map image of 3D landscape generated by the map data arranging part 4 of FIG. 22.

FIG. 24 shows an exemplary map image of 3D landscape generated by the map data arranging part 4 of FIG. 22. In FIG. 24, the map image has an object model indicative of the vehicle displayed in the middle, and on the right side thereof, object models indicative of meandering vehicles on a road. As to those object models indicative of meandering vehicles, the size thereof is changed based on a distance from the viewpoint coordinates as described above, thereby adding depth to the map image of 3D landscape even if the object models are 2D.

Lastly, exemplified is a case where the data provided by the object model display information storage part 6 to the map data arranging part 4 is 2D, and the map data by the map data storage part 3 is 2D, and a resulting map image is of a 3D landscape.

If this is the case, the map data arranging part 4 of FIG. 22 is additionally provided with the bird's eye view transformation part 141 of FIG. 16, or the 3D map data generation part 147 of FIG. 19, both of which convert 2D map data into 3D map data. Also, in such map data arranging part 4, the 3D data arranging part 143 performs data arrangement of the map data and the 2D object model data from the 2D/3D coordinate transformation part 144. Here, the components included therein operate similarly to those described above.

In such case as a map image of 3D landscape being generated from 2D data, the 2D data stored in the object model display information storage part 6 is less in amount than 3D data. Therefore, if storing object model data varying in type, the object model display information storage part 6 can store the larger number of types, and if storing the same type of object model data, the capacity thereof can be reduced.

Further, in such case as a map image of 3D landscape being generated from 2D data, the driver of the vehicle can intuitively understand information even if object models are 2D. For example, if there is a nearby vehicle meanderingly approaching, the driver of the vehicle can easily and intuitively understand how the nearby vehicle is behaving only by seeing an object model indicative of meandering vehicle behind his/her vehicle.

While the invention has been described in detail, the foregoing description is in all aspects illustrative and not restrictive. It is understood that numerous other modifications and variations can be devised without departing from the scope of the invention.

What is claimed is:

1. A navigation device of a vehicle-mounted type for detecting circumstances around a vehicle, and if considers warning a user is appropriate, arranging an applicable object model for display on a map image, and making a guidance to a destination, said device comprising:

an input part for receiving the user's instruction;

a position detection part for detecting a current position of the vehicle;

a map data storage part for previously storing map data;

an object model display information storage part for previously storing object model display information for displaying said object model on said map image;

a route selection part for selecting a route to the destination based on said instruction provided by said input part, said current position detected by said position detection part, and said map data stored in said map data storage part;

an external monitor part for monitoring the circumstances around the vehicle, and outputting resulting monitor information;

an obstacle detection part for detecting an obstacle observed outside of the vehicle based on said monitor information provided by said external monitor part, and outputting resulting external information including position information of said obstacle;

a map data arranging part for creating said object model, if decided that warning the user is appropriate, based on drive assistant information including the position information as in the external information and the object model display information for said object model, and arranging the object model on said map image;

a guiding part for determining whether said obstacle requires the user's attention based on said external information provided by said obstacle detection part, and if requires, generating said drive assistant information, and generating guidance information including resulting map image outputted from said map data arranging part in response to said route selected by said route selection part, said current position detected by said position detection part, and said map data provided by said map data storage part; and a display part for displaying said guidance information generated by said guiding part.

2. The navigation device according to claim 1, wherein said external monitor part includes an image capture device for capturing an image covering around the vehicle, and said obstacle detection part detects, based on said monitor information including said image received from said external monitor part, said obstacle observed around the vehicle through the image.

3. The navigation device according to claim 2, wherein said obstacle detection part determines a type of said obstacle, and outputting the external information including type information of said obstacle, and said guiding part determines whether said obstacle requires the user's attention based on said type information.

4. The navigation device according to claim 2, wherein said obstacle detection part detects a predetermined sign attached to said obstacle, and outputting the external information including sign information of said obstacle, and said guiding part determines whether said obstacle requires the user's attention based on said sign information.

5. The navigation device according to claim 2, wherein said obstacle detection part detects which side of blinkers is flashing on and off, and outputting the external information including directional information of said obstacle, and said guiding part determines whether said obstacle requires the user's attention based on said directional information.

6. The navigation device according to claim 1, wherein said guiding part determines whether said vehicle is in a with-care state by estimating any situational change possible for either the vehicle or said object or both, and based on the with-care state, determines whether said obstacle requires the user's attention.

7. The navigation device according to claim 6, wherein said guiding part estimates said situational change by analyzing said route selected by said route selection part, and determines whether said vehicle is in said with-care state.

8. The navigation device according to claim 1, wherein said guiding part generates said drive assistant information including a threat attribute for said obstacle requiring the user's attention, and said map data arranging part creates an object model corresponding to said threat attribute based on said drive assistant information and the object model display information for said object model provided by said object model display information storage part.

9. The navigation device according to claim 1, wherein said map data arranging part creates a vehicle object model corresponding to said vehicle and a nearby vehicle object model corresponding to said object.

10. The navigation device according to claim 9, wherein said map data arranging part selects a display scale for said map image so that said vehicle object model and said nearby vehicle object model are displayed on said display part with a predetermined space therebetween in consideration of a positional relationship therebetween.

11. The navigation device according to claim 1, wherein said map data arranging part comprises:

an object model creation part for creating said object model based on said drive assistant information and the object model display information for the object model provided by said object model display information storage part; and a data arranging part for arranging said object model on said map image.

12. The navigation device according to claim 11, wherein said map data arranging part further comprises a 3D map generation part for generating a 3D map based on 2D map data provided by said map data storage part, and said data arranging part arranges said object model onto the 3D map generated by said 3D map generation part.

13. The navigation device according to claim 11, wherein said map data arranging part further comprises a 2D/3D coordinate transformation part for transforming the object model, which is 2D, created by said object model creation part to a 3D object model, and said data arranging part arranges the 3D object model transformed by said 2D/3D coordinate transformation part onto said map image.

14. A navigation method for detecting circumstances around a vehicle, and if considers warning a user is appropriate, arranging an applicable object model for display on a map image, and making a guidance to a destination, said method comprising:

a receiving step of receiving the user's instruction;

a position detecting step of detecting a current position of the vehicle;

an external monitoring step of monitoring the circumstances around the vehicle, and outputting resulting monitor information;

an obstacle detecting step of detecting an obstacle observed outside of the vehicle based on said monitor information, and generating external information including position information of said obstacle;

a route selecting step of selecting a route to the destination based on said instruction provided in said inputting step, said current position detected in said position detecting step, and map data previously provided;

a map data arranging step of creating said object model, if decided that warning the user is appropriate, according to drive assistant information generated based on said external information and the object model display information for the object model, and arranging the object model on said map image;

a guiding step of generating guidance information including resulting map image outputted in said map data arranging step in response to said route selected in said route selecting step, said current position detected in said position detecting step, and said map data; and a displaying step of displaying said guidance information generated in said guiding step.

15. The navigation method according to claim 14, wherein in said external monitoring step, an image covering around the vehicle is captured, and in said obstacle detecting step, based on said monitor information including said image captured in said external monitoring step, said obstacle observed around the vehicle is detected through the image thereof.

16. The navigation method according to claim 14, wherein in said guiding step, whether said vehicle is in a with-care state is determined by estimating any situational change possible for either the vehicle or said object or both, and based on the with-care state, whether the obstacle requires the user's attention is determined.

17. The navigation method according to claim 14, wherein in said guiding step, said drive assistant information including a threat attribute for said obstacle requiring the user's attention is generated, and in said map data arranging step, an object model corresponding to said threat attribute is created based on said drive assistant information and said object model display information for the object model.

18. The navigation method according to claim 14, wherein in said map data arranging step, a vehicle object model corresponding to said vehicle and a nearby vehicle object model corresponding to said obstacle are created, and a display scale for said map image is so selected that said vehicle object model and said nearby vehicle object model are displayed with a predetermined space therebetween in consideration of a positional relationship therebetween.

19. The navigation method according to claim 14, wherein said map data arranging step comprises:

an object model creating step for creating said object model based on said drive assistant information and said object model display information; and a data arranging step of arranging said object model on said map image.

20. The navigation method according to claim 19, wherein said map data arranging step further comprises a 3D map generating step of generating a 3D map based on 2D map data, and in said data arranging step, said object model is arranged on said map image.

21. The navigation method according to claim 19, wherein said map data arranging step further comprises a 2D/3D coordinate transforming step of transforming the object model, which is 2D, created in said object model creating step to a 3D object model, and in said data arranging step, the 3D object model transformed in said 2D/3D coordinate transforming step is arranged onto said map image.

22. A computer readable recording medium having a program recorded thereon to be run on a navigation device of a vehicle-mounted type for detecting circumstances around a vehicle, and if considers warning a user is appropriate, arranging an applicable object model for display on a map image, and making a guidance to a destination, said program comprising:

a receiving step of receiving the user's instruction;

a position detecting step of detecting a current position of the vehicle;

an external monitoring step of monitoring the circumstances around the vehicle, and outputting resulting monitor information;

an obstacle detecting step of detecting an obstacle observed outside of the vehicle based on said monitor information, and generating external information including position information of said obstacle;

a route selecting step of selecting a route to the destination based on said instruction provided in said inputting step, said current position detected in said position detecting step, and map data previously provided;

a map data arranging step of creating said object model, if decided that warning the user is appropriate, according to drive assistant information generated based on said external information and the object model display information for the object model, and arranging the object model on said map image;

a guiding step of generating guidance information including resulting map image outputted in said map data arranging step in response to said route selected in said route selecting step, said current position detected in said position detecting step, and said map data; and a displaying step of displaying said guidance information generated in said guiding step.

23. A program to be run on a navigation device of a vehicle-mounted type for detecting circumstances around a vehicle, and if considers warning a user is appropriate, arranging an applicable object model for display on a map image, and making a guidance to a destination, said program comprising:

a receiving step of receiving the user's instruction;

a position detecting step of detecting a current position of the vehicle;

an external monitoring step of monitoring the circumstances around the vehicle, and outputting resulting monitor information;

an obstacle detecting step of detecting an obstacle observed outside of the vehicle based on said monitor information, and generating external information including position information of said obstacle;

a route selecting step of selecting a route to the destination based on said instruction provided in said inputting step, said current position detected in said position detecting step, and map data previously provided;

a map data arranging step of creating said object model, if decided that warning the user is appropriate, according to drive assistant information generated based on said external information and the object model display information for the object model, and arranging the object model on said map image;

a guiding step of generating guidance information including resulting map image outputted in said map data arranging step in response to said route selected in said route selecting step, said current position detected in said position detecting step, and said map data; and a displaying step of displaying said guidance information generated in said guiding step.

* * * * *